(12) United States Patent
Ogata

(10) Patent No.: US 7,640,243 B2
(45) Date of Patent: Dec. 29, 2009

(54) IMAGE FORMING APPARATUS INCLUDING A DOCUMENT STORING SECTION

(75) Inventor: Katsuki Ogata, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/609,830

(22) Filed: Dec. 12, 2006

(65) Prior Publication Data

US 2007/0083516 A1    Apr. 12, 2007

Related U.S. Application Data

(63) Continuation of application No. 11/015,986, filed on Dec. 16, 2004.

(51) Int. Cl.
G06F 7/00 (2006.01)
G06K 9/36 (2006.01)

(52) U.S. Cl. .................................... 707/8; 382/232

(58) Field of Classification Search ............. 707/8; 382/232

See application file for complete search history.

(56) References Cited

U.S. PATENT DOCUMENTS 6,009,425 A * 12/1999 Mohan .................... 707/8
7,124,131 B2 * 10/2006 Guthridge et al. ......... 707/8
7,246,119 B2 * 7/2007 Kuwata et al. ............ 707/8
2003/0182285 A1 * 9/2003 Kuwata et al. ............ 707/8
2003/0210803 A1 * 11/2003 Kaneda et al. .......... 382/100
2004/0230599 A1 * 11/2004 Moore et al. ............ 707/102

FOREIGN PATENT DOCUMENTS

| JP | 6-59947 | * 3/1994 |
| JP | 7-271826 | * 10/1995 |
| JP | 2003-99299 | * 4/2003 |

* cited by examiner

Primary Examiner—John E Breene
Assistant Examiner—Joshua Bullock
(74) Attorney, Agent, or Firm—SoCal IP Law Group LLP; Steven C. Sereboff; M. Kala Sarvaiya

(57) ABSTRACT

An image forming apparatus includes a storing section provided with a box which stores an electronic document file, a first instruction accepting section which accepts an instruction for deleting the electronic document file stored in the box, a second instruction accepting section which accepts an instruction other than the instruction for deleting the electronic document file, a deleting processing section configured to execute processing for deleting the electronic document file stored in the box, when receiving the instruction for deleting the electronic document file, from the first instruction accepting section, and a main processing section configured to execute processing other than the processing for deleting the electronic document file, in parallel with the first deleting processing, when receiving the instruction other than the instruction for deleting the electronic document file, from the second instruction accepting section, while the deleting processing is being executed by the first deleting processing section.

10 Claims, 20 Drawing Sheets

IMAGE FORMING APPARATUS INCLUDING A DOCUMENT STORING SECTION

RELATED APPLICATION INFORMATION

This patent claims priority from and incorporated by reference application Ser. No. 11/015,986 filed Dec. 16, 2004.

BACKGROUND

1. Field

The present invention relates to an image forming apparatus which can store kinds of data items in boxes provided in a storage section, and manage the kinds of data.

2. Description of the Related Art

In recent years, image forming apparatuses such as a copying machine and a multi-function peripheral (MFP) have been provided to have a function of storing image data of an original scanned and data received through a network, etc., as electronic documents, in a hard disk drive. Specifically, in the hard disk drive, boxes for storing electronic documents are prepared for users, respectively. To be more specific, the boxes are used in storing electronic documents obtained with scanning or the like by the users. When a box storing an electronic document file or the like is deleted, it is carried out by the user by using a control panel of the MFP. Also, an electronic document file in a box is managed by the user by a PC or the like connected to the MFP through the Internet.

When deleting a box or the like, a conventional MFP cannot accept another operation until deletion is completed. Thus, the user cannot leave the image forming apparatus until confirming completion of the processing. Furthermore, when kinds of data stored in a box is downloaded to a PC, and of one box. In addition, an electronic document file stored in a box cannot be downloaded, unless a predetermined operation is performed by the user with the PC or the like.

Therefore, an image forming apparatus is required to be provided, which enables an electronic document file stored in a box to be easily handled.

BRIEF SUMMARY OF THE INVENTION

According to one embodiment of downloaded kinds of data is uploaded from the PC to the MFP, these processings need to be performed in units the present invention, an image forming apparatus comprises: a storing section including a box which stores an electronic document file; a first instruction accepting section which accepts an instruction for deleting the electronic document file stored in the box; a second instruction accepting section which accepts an instruction other than the instruction for deleting the electronic document file; a deleting processing section configured to execute processing for deleting the electronic document file stored in the box, when receiving the instruction for deleting the electronic document file, from the first instruction accepting section; and a main processing section configured to execute processing other than the processing for deleting the electronic document file, in parallel with the first deleting processing, when receiving the instruction other than the instruction for deleting the electronic document file, from the second instruction accepting section, while the deleting processing is being executed by the first deleting processing section.

Objects and advantages of the invention will become apparent from the description which follows, or may be learned by practice of the invention.

DESCRIPTION OF THE DRAWINGS

The accompanying drawings illustrate embodiments of the invention, and together with the general description given above and the detailed description given below, serve to explain the principles of the invention.

DETAILED DESCRIPTION

First of all, a structure common to the embodiments of the present invention, which will be explained later, will be explained.

Figure 1:
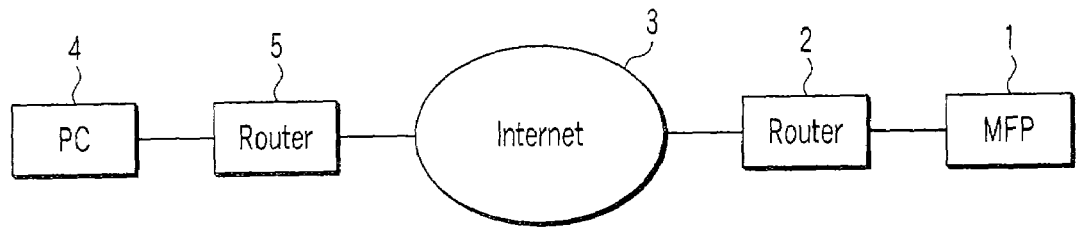
FIG. 1 is a view showing a network structure which is common to the embodiments of the present invention.

FIG. 1 is a view showing a network structure common to the embodiments. An MFP 1 is connected to the Internet 3 through a router 2. A PC 4 is connected to the Internet 3 through a router 5. In such a manner, since the PC 4 is connected to the Internet 3, it can communicate with the MFP 1.

FIG. 1 is a view showing a network structure common to the embodiments. An MFP 1 is connected to the Internet 3 through a router 2. A PC 4 is connected to the Internet 3 through a router 5. In such a manner, since the PC 4 is connected to the Internet 3, it can communicate with the MFP 1.

Figure 2:
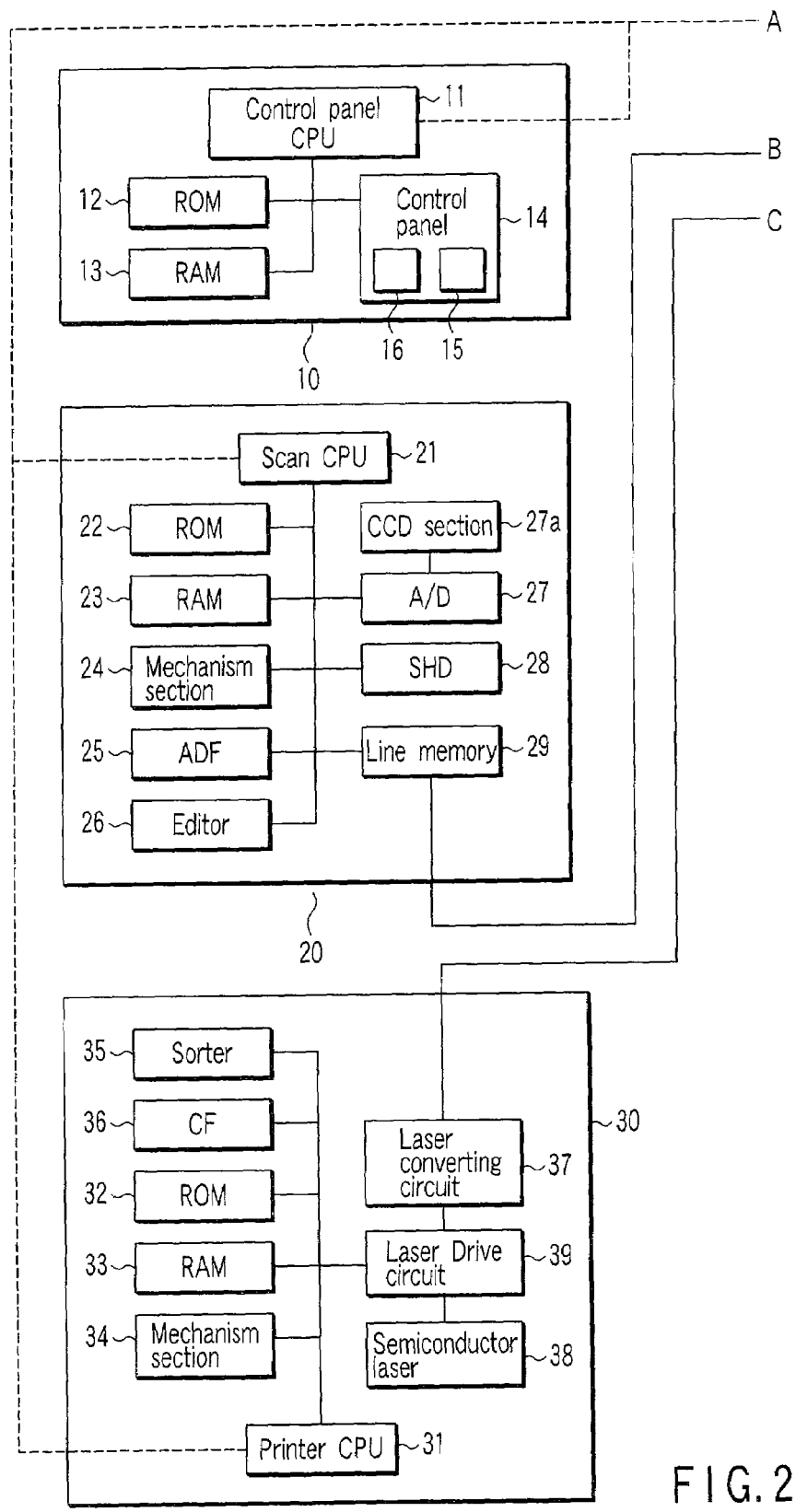
FIG. 2 is a view schematically showing part of the structure of an image forming apparatus, which is common to the embodiments.
Figure 3:
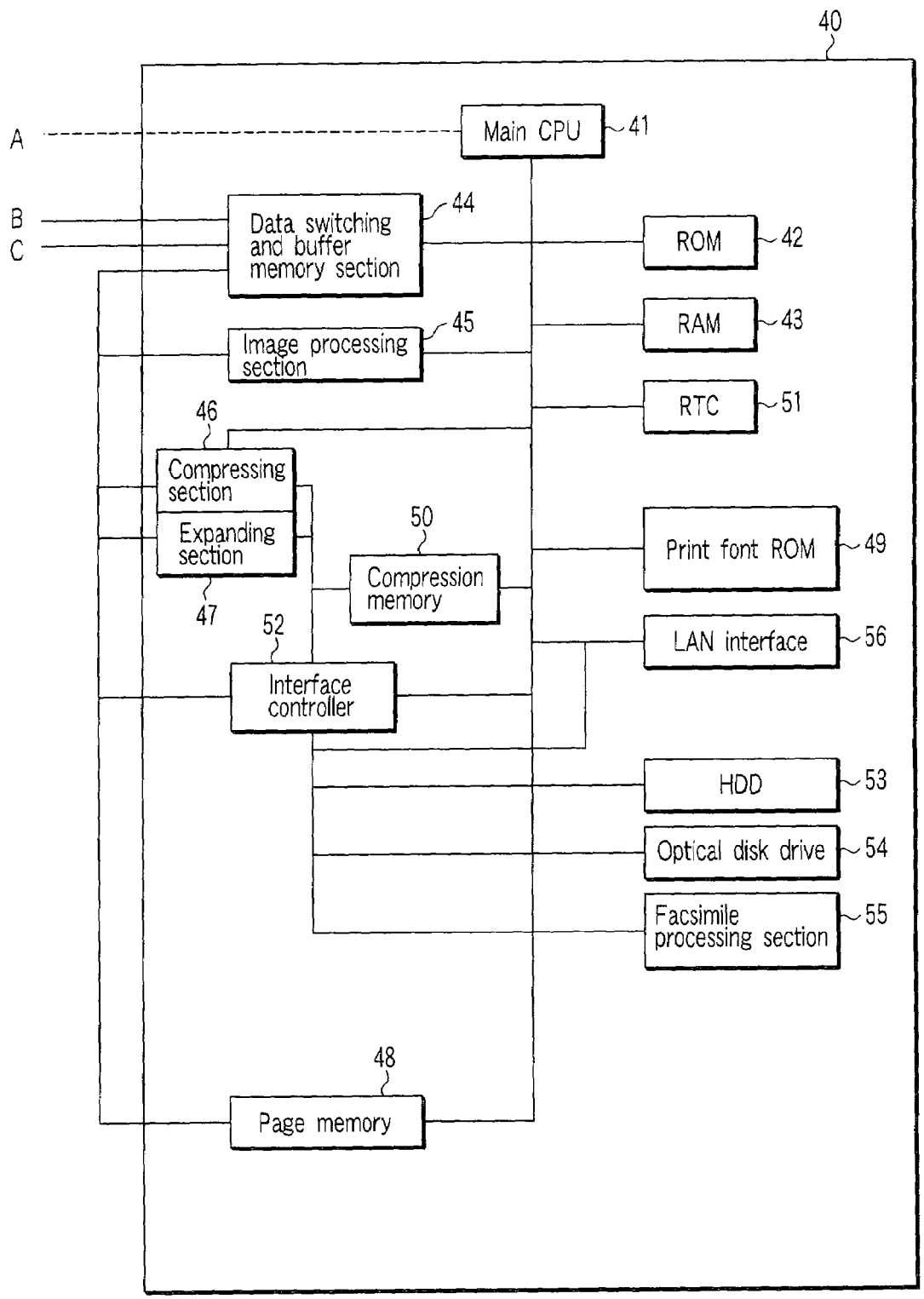
FIG. 3 is a view schematically showing another part of the structure of the image forming apparatus, which is common to the embodiments.

As shown in FIGS. 2 and 3, a main CPU 41, a control panel CPU 11, a scan CPU 21 and a printer CPU 31 control the basic processing section 40, the control panel section 10, the scan section 20 and the printer section 30, respectively. Furthermore, the main CPU 41 communicates with the control panel CPU 11, the scan CPU 21 and the printer CPU 31 to control these CPUs.

The control panel CPU 11 is connected to a ROM 12 and a RAM 13. Also, the control panel CPU 11 controls an input section 15 and a touch panel 16 on the control panel 14 on the basis of data stored in the ROM 12 and the RAM 13. In the input section 15, function keys such as a start key and a register key, etc. are provided.

The scan CPU 21 controls a mechanism section 24 of a motor and a solenoid (which are not shown), an automatic document feeder (ADF) 25, a coordinate input device (editor) 26, an analog-to-digital converting circuit (A/D) 27, a shading compensating circuit (SHD) 28 and a line memory 29, etc. on the basis of data stored in a ROM 22 and a RAM 23. Furthermore, a charge-coupled device (CCD) section 27a is connected to the A/D 27.

The printer CPU 31 controls a mechanism section 34 of a motor and a solenoid (which are not shown), a sorter 35, a cassette feeder (CF) 36, a laser converting circuit 37 and a laser drive circuit 39 for controlling a semiconductor laser 38, etc. on the basis of data stored in a ROM 32 and a RAM 33. The printer section 30 is formed to form a color image by superimposing toner images of four colors, i.e., yellow, cyan, magenta and black, on the basis of, e.g., predetermined image data.

The main CPU 41 controls the MFP 1 as a whole in accordance with fixed data and a control program, etc. stored in a ROM 41 and a RAM 43.

A data switching and buffer memory section 44 switches the section to which image data read by the scan section 20 is to be sent or the data to be sent to the printer section 30, and performs buffering. An image processing section 45 performs image processing on, e.g., the data read by the scan section 20 and sent from the data switching and buffer memory section 44. A compressing section 46 compresses image data, and an expanding section 47 expands compressed image data. A page memory 48 stores image data of each page. A print font ROM 49 develops code data on the page memory 48, and a compression memory 50 stores data compressed by the compressing section 46. A real time clock (RTC) 51 generates present time information.

Furthermore, the main CPU 41 is connected to a hard disk drive (HDD) 53, an optical disk drive 54, a facsimile processing section 55 and a local area network (LAN) interface through an interface controller 52. The optical disk drive 54 reads information stored in a set disk. The facsimile processing section 55 transfers processed image data to the outside through a communication line (not shown) connected to the MFP 1, or inputs image data received from the outside through the communication line. The LAN interface 56 is used in connection to the Internet 3 through the router 2.

Figure 4:
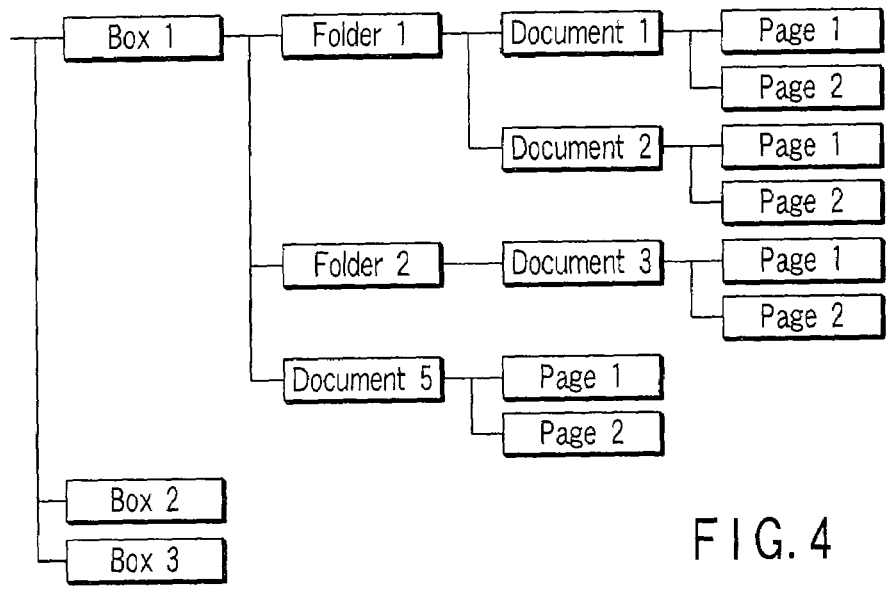
FIG. 4 is a view schematically showing the structure of a box, which is common to the embodiments.

The HDD 53 stores, e.g., a control program or kinds of data such as an electronic document file. The electronic document film is stored in a box provided in the HDD 53. FIG. 4 is a view for use in explaining the structure of boxes for storing electronic document files. In each of the boxes, a number of folders are provided, and electronic document files can be stored. In the folders, a number of electronic document files can be stored. The electronic document files each comprise data of each of pages. As such boxes, one public box shared with users using the MFP 1 and 200 user boxes assigned to the users can be provided. In one box, 100 folders can be provided at the maximum. Also, in one folder, 400 electronic document files can be provided at the maximum. It should be noted that the greatest number of pages which can be included in the electronic document file is 1000.

An electronic document file stored in a box in such a manner is, e.g., data read by the scan section at a scan function time, print data sent from the PC 4, data read by the scanner section at a copy function time and data used by a facsimile function. This electronic document file is stored in a box designated by a user. The format type at the time of storing the electronic document file in the box varies in accordance with, e.g., which of a scan time, a print time, a copy time and a fax time is time at which image data is used, and the kind of the image data used at that time. For example, at the copy time and the print time, a color image and a monochrome image are both stored in an original format set by a maker of the MFP 1. At a scan input time, a color image and a gray image are stored in a Joint Photographic Experts Group (JPEG), and a monochrome image is stored in a Modified Modified Read (MMR). At the fax time, a monochrome image is stored in the MMR.

Figure 5:
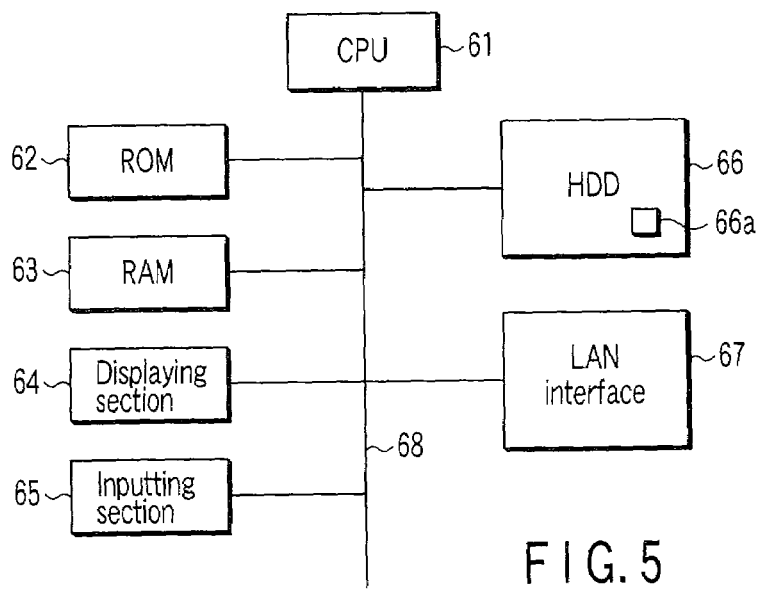
FIG. 5 is a view schematically showing the structure of a computer apparatus, which is common to the embodiments.

FIG. 5 is a view schematically showing the internal structure of the PC 4. The PC 4 includes a CPU 61, a ROM 62, a RAM 63, a displaying section 64, an inputting section 65, an HDD 66 and a local area network (LAN) interface 67. The CPU 61 is connected to the ROM 62, the RAM 63, the displaying section 64, the inputting section 65, the HDD 66 and the LAN interface 67 through a bus line 68.

The CPU 61 collectively controls those sections by executing a control program stored in the ROM 63. In the ROM 62, the control program to be executed by the CPU 61 is stored. In the RAM 63, a work area necessary for the CPU 61 to perform kinds of processings and etc. are formed. The displaying section 64 is, e.g., a display, and displays information to the user. The inputting section 65 is, e.g., a keyboard and a mouse, and is used when an instruction is input by the user. The HDD 66 stores kinds of data such as image data or a control program. Also, in the HDD 66, a setting storing section 66a stores setting of an automatic download which will be explained later with respect to the third embodiment which will be described later. The LAN interface 67 is connected to the Internet 3 through the router 5.

The first to third embodiments of the present invention using the above PC 4 and the MFP 1 will be explained with reference to the accompanying drawings.

The First Embodiment

The first embodiment will be explained by referring to the case where a user operates the control panel 14 to select or delete any of boxes, folders and electronic document files in the HDD 53 in the MFP 1.

Figure 6:
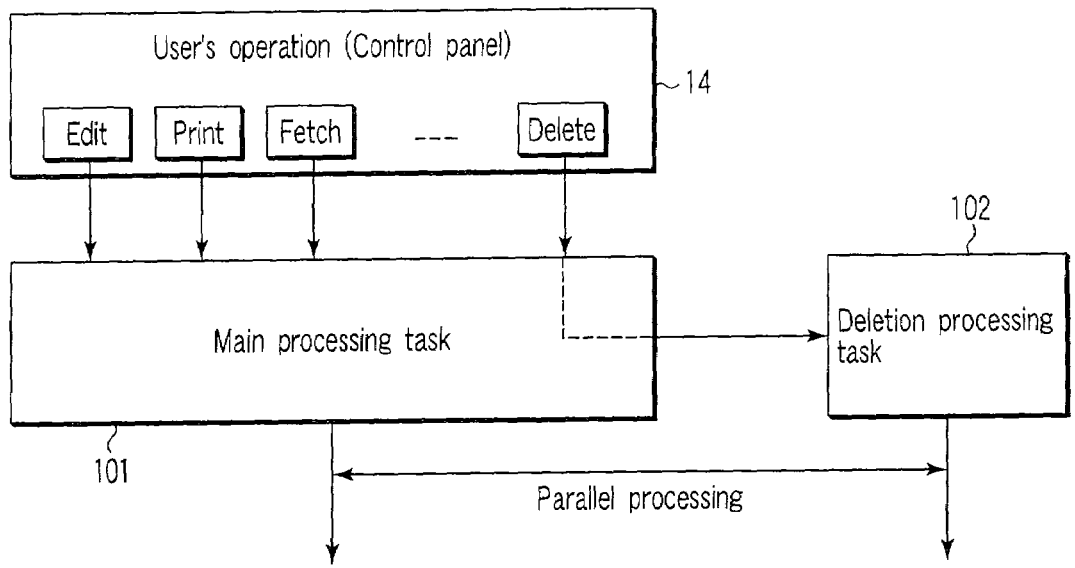
FIG. 6 is a view schematically showing a task configuration in the first embodiment.

FIG. 6 is a view schematically showing the configurations of tasks to be processed by the main CPU 41 of the MFP 1. The tasks comprise a main processing task and a deletion processing task. The user operates the control panel 14 to edit an electronic document file stored in a box in the HDD 53, print predetermined image data, etc. and fetch an electronic document file into a box. Furthermore, the user operates the control panel 14 to instruct that deletes a box, a folder or an electric document file provided with HDD. When those instructions are given by the user, a main processing task 101 is informed of them. When being informed of an instruction regarding deletion, the main processing task 101 informs a deletion processing task 102 of the instruction. After informing the deletion processing task 102, the main processing task 101 waits for an instruction other than the deletion processing, from the user. On the other hand, the deletion processing task 102 executes deletion processing. When the main processing task 101 receives another instruction from the user while the deletion processing task 102 is executing the deletion processing, it executes processing based on the instruction. Therefore, in this case, the main processing task 101 and the deletion processing task perform parallel processing.

Figure 7:
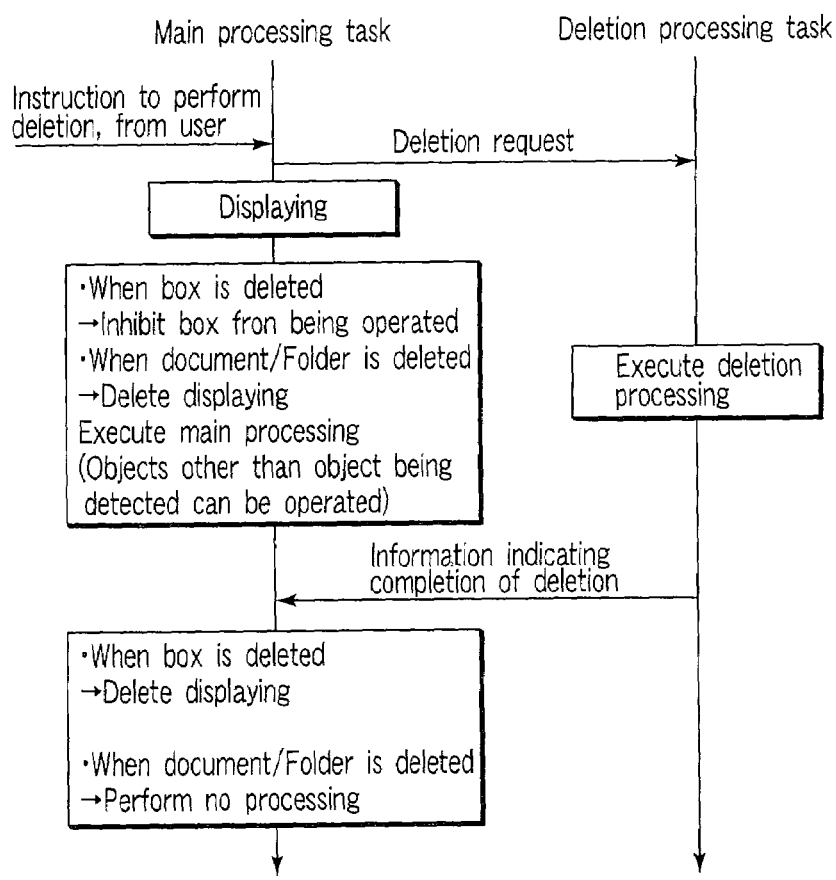
FIG. 7 is a timing chart showing a processing procedure in the first embodiment.

FIG. 7 is a timing chart showing a processing procedure of the deletion processing. When an instruction to delete a box, a folder or an electronic document file, which is designated from the control panel 14 by the user, is given, the main processing task 101 immediately informs the deletion processing task 102 that a deletion request is made. Then, displaying indicating that deletion is being performed is performed by the control panel 14. The deletion processing task 102 executes processing for deleting the designated box, folder or electronic document file. At this time, when an instruction indicating that the box be deleted is given, the main processing task 101 inhibits access to the box, and performs processing for preventing folders and electronic document files in the box from being operated. Also, the main processing task 101 erases displaying indicating that deletion is being performed, performed by the control panel 14, when an instruction indicating that a folder or an electronic document be deleted is given. Even when the deletion processing task 102 is executing the deletion processing, and when, e.g., an instruction other than the box, folder or electronic document file being deleted is given from the control panel 14, the main processing task 101 executes processing according with the instruction. In this case, processing of the deletion processing task 102 and that of the main processing task 101 are performed in parallel with each other. The parallel processing of the main processing task 101 and the deletion processing task 102 is achieved by, e.g., time-sharing the main CPU 41. Furthermore, when the deletion processing is completed, the deletion processing task 102 informs the main processing task 101 of completion of the deletion. When the main processing task 101 receives information indicating completion of the deletion, and when it is instructed to delete a box, it erases an image displayed on the control panel 14, which indicates that deletion is being performed. The main processing task 101 does not perform specific processing when being instructed to delete a folder or an electronic document file.

Figure 8:
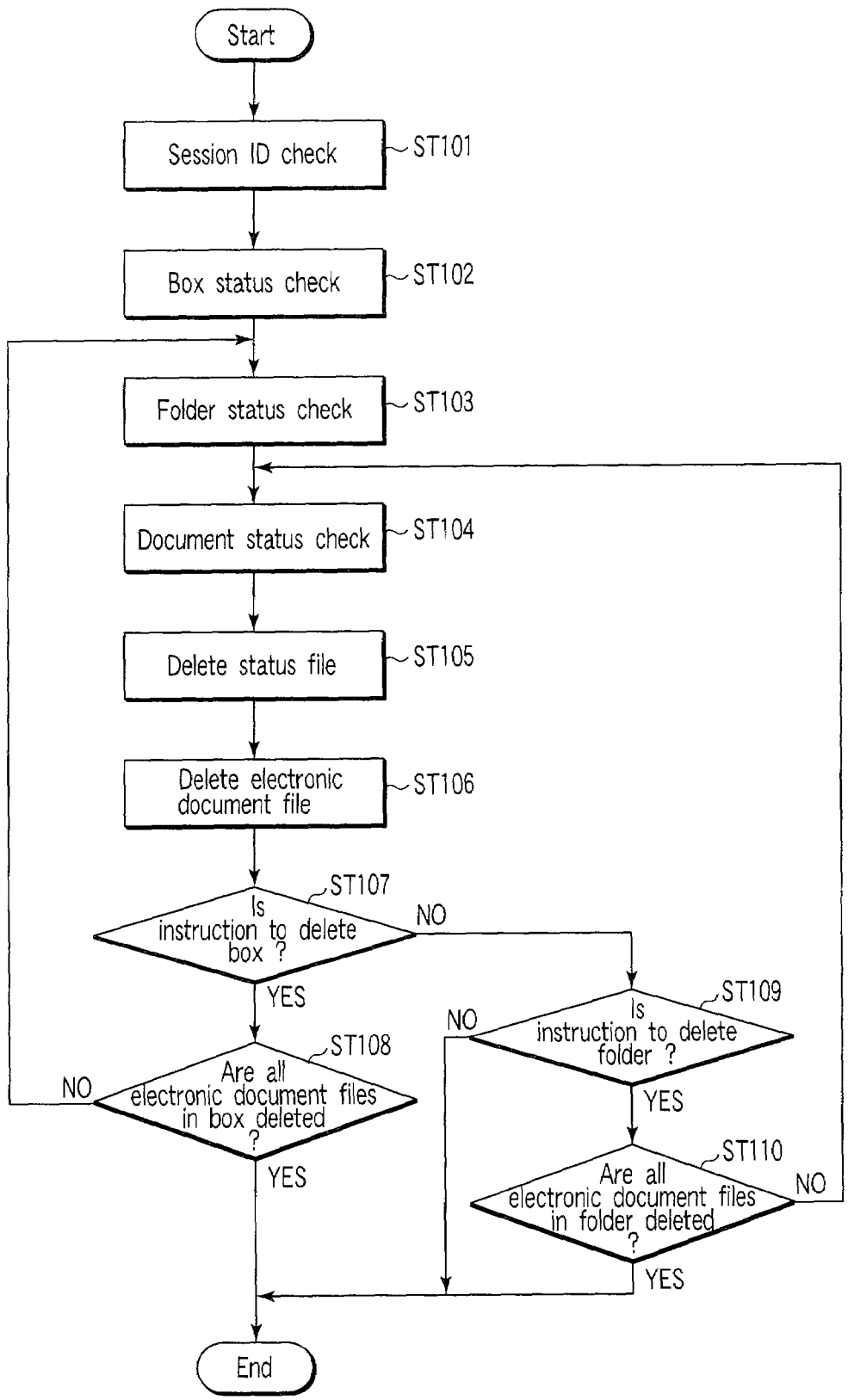
FIG. 8 is a flowchart showing deletion processing in the first embodiment.

FIG. 8 is a flowchart of the deletion processing. First, the main CPU 41 checks a session ID (ST101). When checking of the session ID ends, the main CPU 41 checks a box status (ST102). When checking of the box status ends, the main CPU 41 checks a folder status (ST103). Then, the main CPU 41 checks a document status. Furthermore, the main CPU 41 deletes a status file (ST105). When those processings end, an electronic document file is deleted (ST106).

When an electronic document file is deleted, the main CPU 41 determines whether or not the instruction to perform deletion is an instruction to delete a box (ST107). At this time, when this determination is made as "YES", the main CPU 41 further determines whether or not the electronic document files in a box are all deleted (ST108). At this time, when this determination is made as "NO", the processing to be performed is returned to processing for performing folder checking in step ST103. On the other hand, in the step ST107, when the determination is made as "NO", the main CPU 41 determines whether or not the instruction to perform deletion is an instruction to delete a folder (ST109). At this time, when the determination is made as "YES", the main CPU 41 determines that the electronic document files in a folder are all deleted (ST110). At this time, when the determination is made as "NO", the processing to be performed is returned to processing for performing document checking in step ST104.

When the main CPU 41 determines that the electronic document files in the box are all deleted (YES at ST108), that an instruction to delete a folder cannot be given (NO at ST109), and that the electronic document files in the folder are all deleted (YES at ST110), it ends the processing.

Next, the operation in the case where the user operates the control panel 14 in the MFP 1 having the above structure to delete a box, a folder or an electronic document file will be explained.

Figure 9:
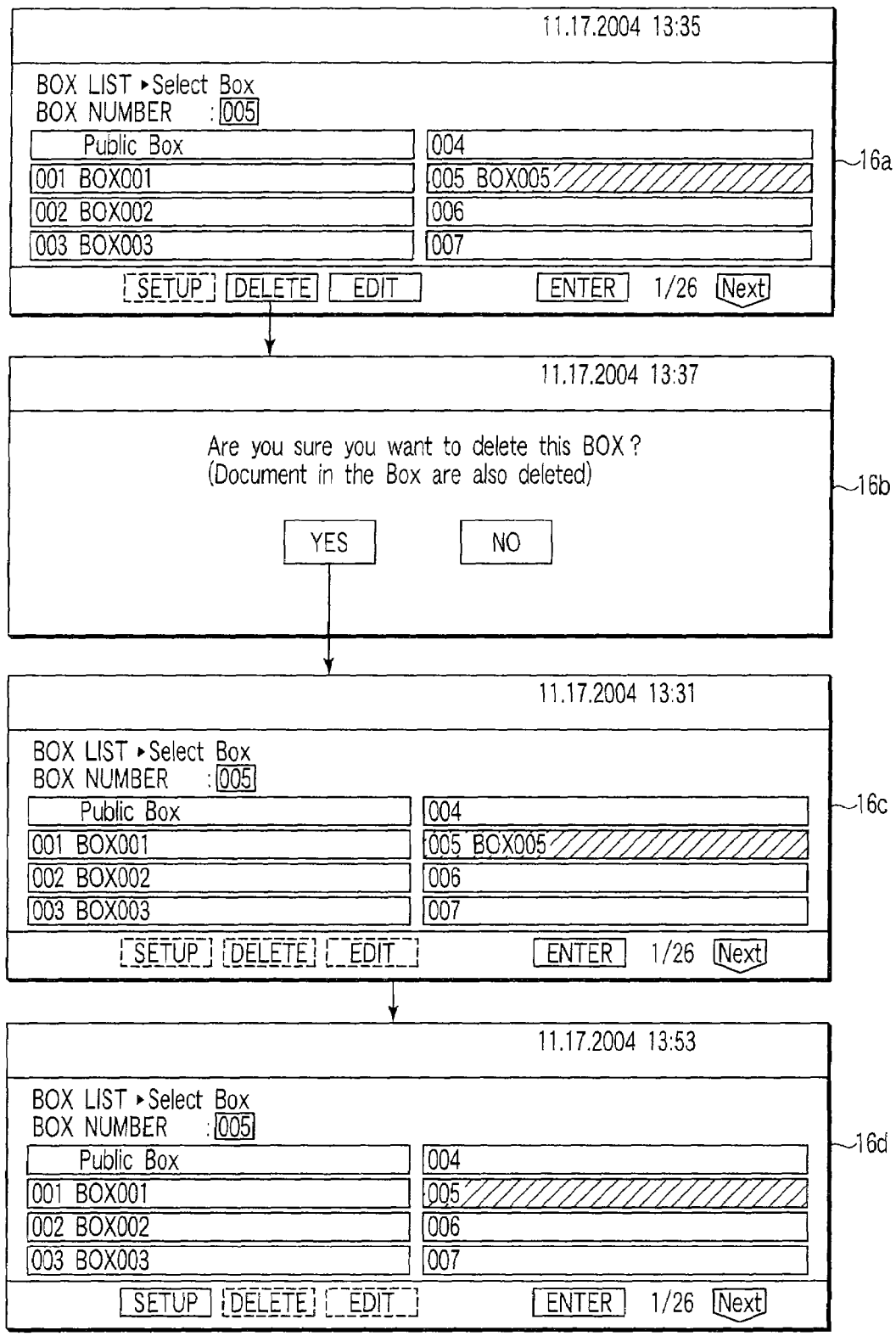
FIG. 9 is a view showing changes of the image on a touch panel when a box is deleted, in the first embodiment.

First, the operation in the case where the user operates the control panel 14 to delete a box made in the HDD 53 will be explained with reference to FIG. 9. FIG. 9 is a view showing changes of the image on the touch panel 16 when the box is deleted. First, the user operates the control panel 14 to invoke an image displaying a list of boxes on the touch panel 16. A touch panel 16a displays an image appearing when the list of boxes is invoked. In the touch panel 16a, "SETUP", "DELETE", "EDIT" and "ENTER" keys are displayed in addition to "Public Box" and boxes having box numbers 001 to 007. Furthermore, in box numbers 001 to 003 and 005, "BOX001", "BOX002", "BOX003" and "BOX005" are prepared, respectively. In those boxes, folders are provided, and electronic document files, etc. are stored.

The user selects a box to be deleted, from among the displayed boxes, by touching it. This will be explained by referring to the case where "BOX005" having box number 005 is deleted. The user touches the "DELETE" key after selecting "BOX005".

The touch panel 16b displays an image appearing when the "DELETE" key is touched. This image is intended to ask the user to make sure of whether to delete the box. In the image, when "YES" is touched by the user, the above deletion processing starts. Therefore, the electronic documents files in a folder in "BOX005" are successively deleted. A touch panel 16c displays an image appearing when "YES" is touched. At this time, with respect to a box having box number 005 which is being deleted, the box name "BOX005" is displayed to indicate that it is being deleted. Furthermore, when "BOX005" is selected, the "SETUP", "DELETE" and "EDIT" keys are displayed in gray to inhibit a user's operation. In this case, only the operation regarding "BOX005" whose box number is 005 is inhibited, i.e., processings on other boxes and other operations can be performed. A touch panel 16d displays an image appearing when the deletion processing ends. The box name "BOX005" of the box having box number 005 is deleted. Thereby, the user visually recognizes that deletion of "BOX005" having box number 005 is completed, and setup, etc. can be re-carried out with respect to the box having box number 005.

In such a manner, the MFP 1 can accept kinds of operations such as editing and printing of electronic document files in boxes other than the box being deleted, and fetching an electronic document file. Thus, the user can freely utilize the MFP 1 even when a box is being deleted. Furthermore, the user can immediately leave the MFP 1 even if he or she does not confirm ending of the deletion processing. In a conventional MFP 1, until deletion of folders or electronic document files in a box is completed, other operations are not accepted. Thus, in the case where it takes long time to delete a box, it takes long time until other operations are allowed to be performed, and it is inconvenient. However, this can be solved by the MFP 1 according to the first embodiment.

Furthermore, until the folders and electronic document files in a box are all deleted, the box name "BOX005" is displayed, and the operation for the box having box number 005 is inhibited. Thus, the user can visually recognize that the box having box number 005 is being deleted, and know that its operation cannot be performed.

Figure 10:
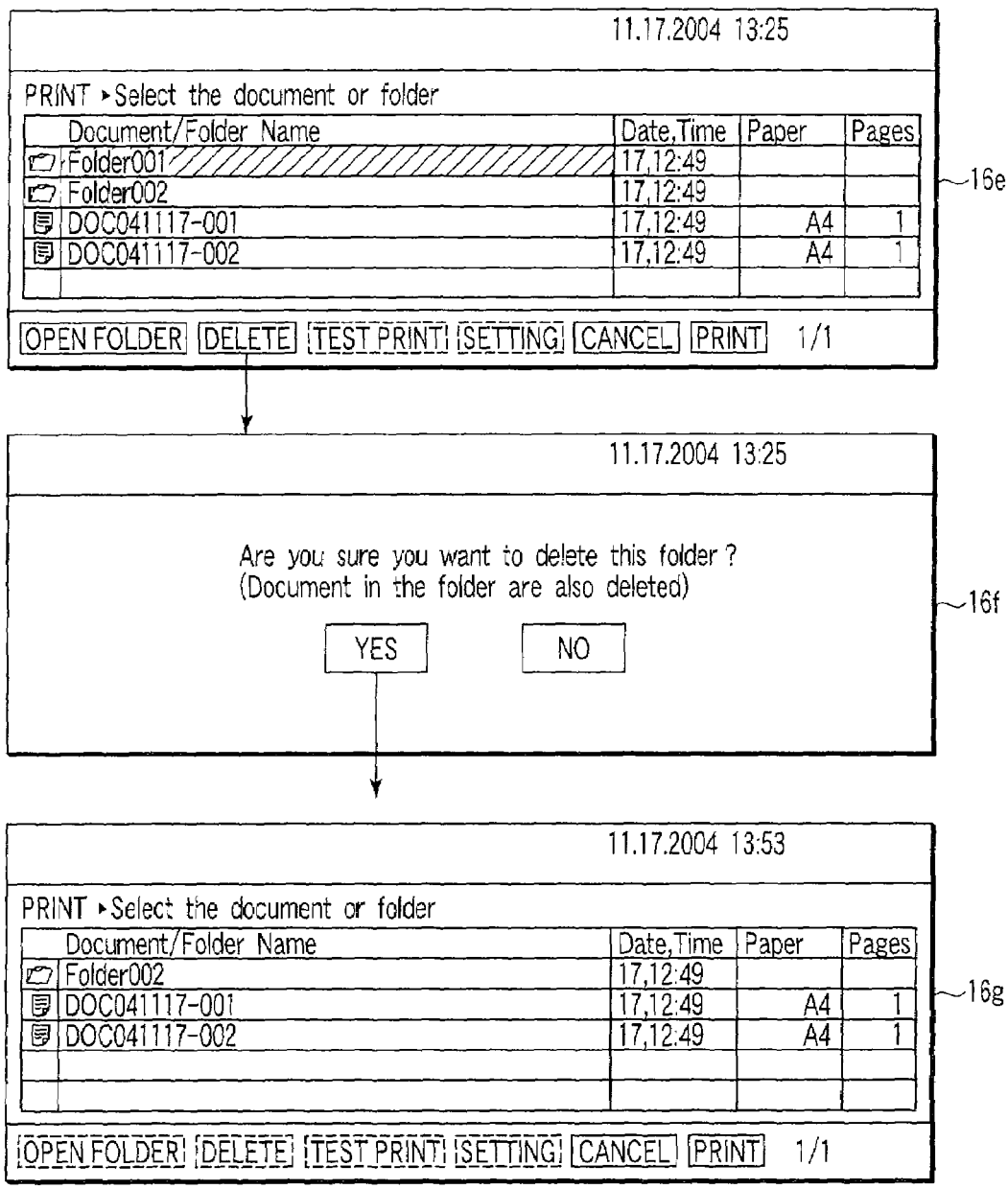
FIG. 10 is a view showing changes of the image on the touch panel when a folder is deleted, in the embodiment.

Next, the operation in the case where the user operates the control panel 14 to delete a folder will be explained with reference to FIG. 10. FIG. 10 is a view showing changes of the image on the touch panel 16 when a folder is deleted. The user operates the control panel 14 to invoke an image displaying folders and electronic document files in a predetermined box, on the touch panel 16. FIG. 16e shows an image appearing when a list of them is invoked. On a touch panel 16e, "OPEN FOLDER", "DELETE", "TESTPRINT" and "SETTING" keys are displayed in addition to the list of folders and electronic document files.

The user selects a box to be deleted, from among the displayed boxes, by touching it. This will be explained by referring to the case where the folder "FOLDER001" is deleted. The user inputs the "DELETE" key after selecting "FOLDER001".

A touch panel 16f displays an image appearing when the "DELETE" key is touched. This image is intended to ask the user to make sure of whether to delete the folder. In the image, when "YES" is selected by the user, the above deletion processing starts. Therefore, the electronic documents files in the "folder001" are successively deleted. Furthermore, at this time, "FOLDER001" is immediately erased from the displayed list. A touch panel 16g displays an image appearing when "YES" is touched. In a list displayed on the touch panel 16g, "FOLDER001" is not displayed. Furthermore, in the touch panel 16g, a user's operation can be accepted.

Figure 11:
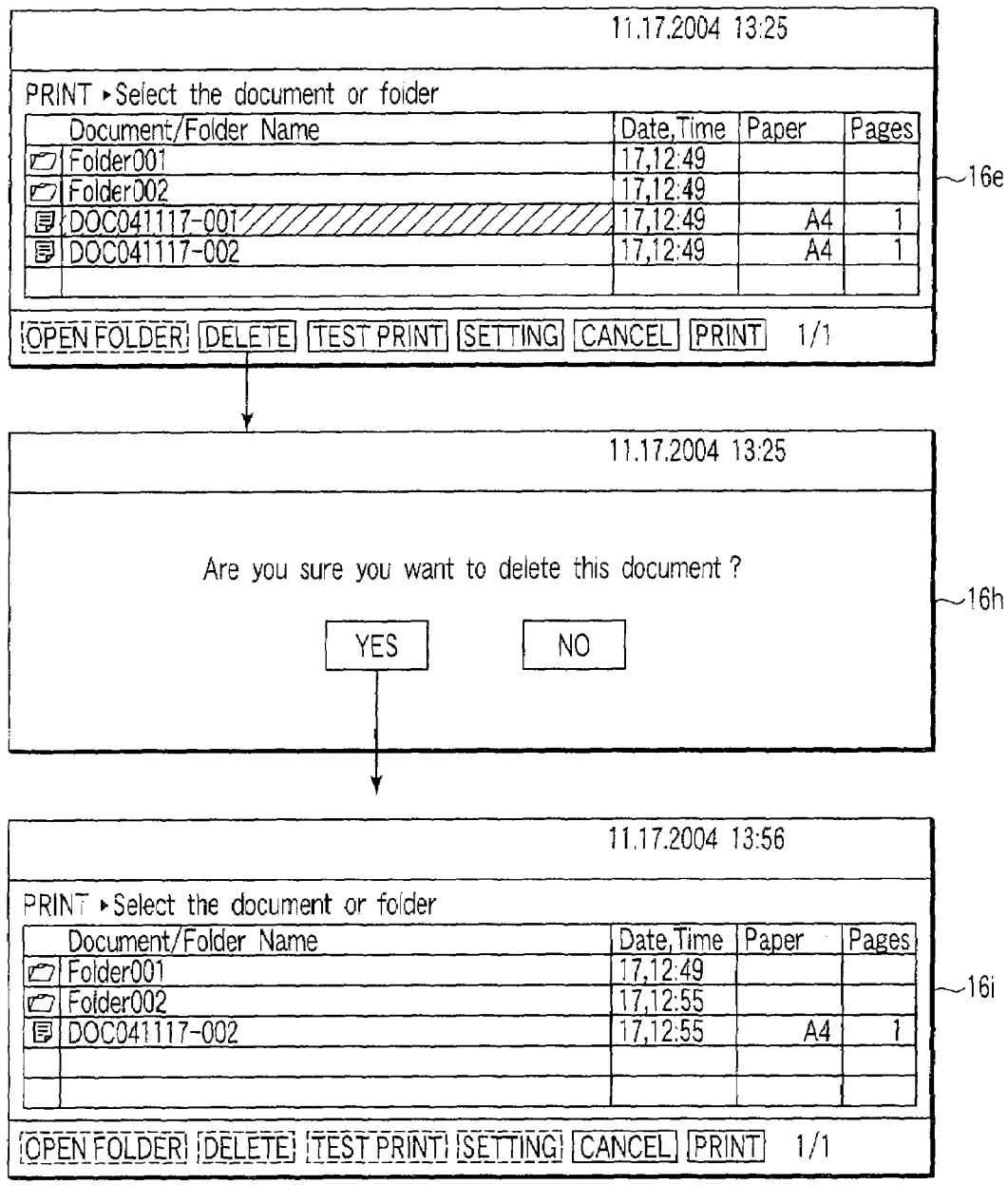
FIG. 11 is a view showing changes of the image on the touch panel when an electronic document file is deleted, in the embodiment.

Lastly, the operation in the case where the user operates the control panel 14 to delete an electronic document file will be explained with reference to FIG. 11. It will be explained by referring to the case where the user deletes an electronic document file in a list displayed on the touch panel 16e.

The user selects an electronic document file to be deleted, from the displayed electronic document files, by touching it. It will be explained by referring to the case where electronic document file "DOC041117-001" is deleted. The user inputs the "DELETE" key after selecting "DOC041117-001".

A touch panel 16h displays an image appearing when the "DELETE" key is touched. This image is intended to ask the user to make sure of whether to erase the electronic document file. In this image, when "YES" is selected, the above deletion processing starts. At this time, "DOC041117-001" is immediately erased from the displayed list. A touch panel 16i displays an image appearing when "YES" is touched. In a list displayed on the touch panel 16i, "DOC041117-001" is not displayed. Furthermore, in the touch panel 16i, an operation can be accepted from the user.

In such a manner, in the MFP 1 according to the first embodiment, when a folder or an electronic document file is deleted, kinds of operations such as editing and printing of an electronic document file in another box and fetching of an electronic document file can be accepted immediately.

The Second Embodiment

Next, the second embodiment will be explained. In the second embodiment, in a file management function of managing, with the PC 4, electronic document files stored in a box in the HDD 53 in the MFP 1, archiving/uploading is carried out in unit of one electronic document file.

Figure 12:
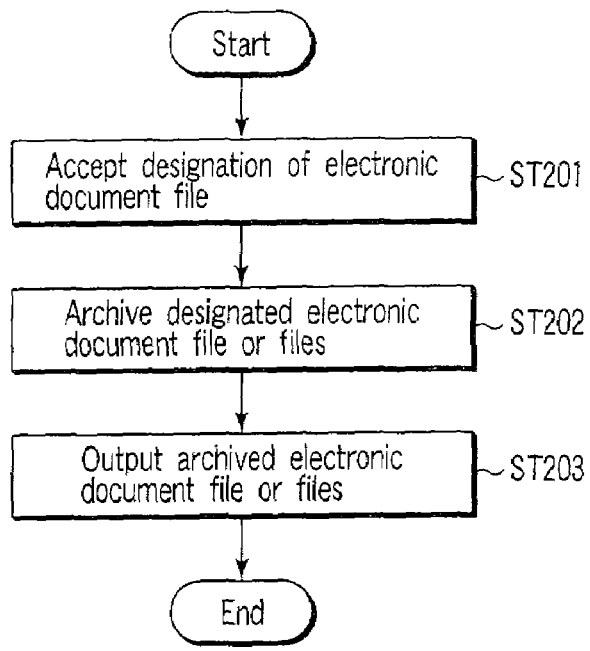
FIG. 12 is a flowchart showing processing in the second embodiment.

FIG. 12 is a flowchart schematically showing processing performed when the main CPU 41 of the MFP 1 executes archiving of an electronic document file. First, designation of an electronic document file stored from the PC4 in a box in the HDD 53 is accepted (ST201). In this designation, one electronic document file may be designated, and a number of electronic document files may be designated as long as they are in a box. Then, the main CPU 41 archives a designated electronic file or files (ST202). Due to this archiving processing, the designated electronic document file or files are collected and compressed together with each other. In the second embodiment, they are compressed in a Zip format. Then, the main CPU 41 outputs the archived electronic document file or files to the PC4 being accessing the box (ST203).

Next, the operation in the case where the user uses the PC 4 to archive an electronic document file or files stored in a box in the MFP 1 will be explained.

Figure 13:
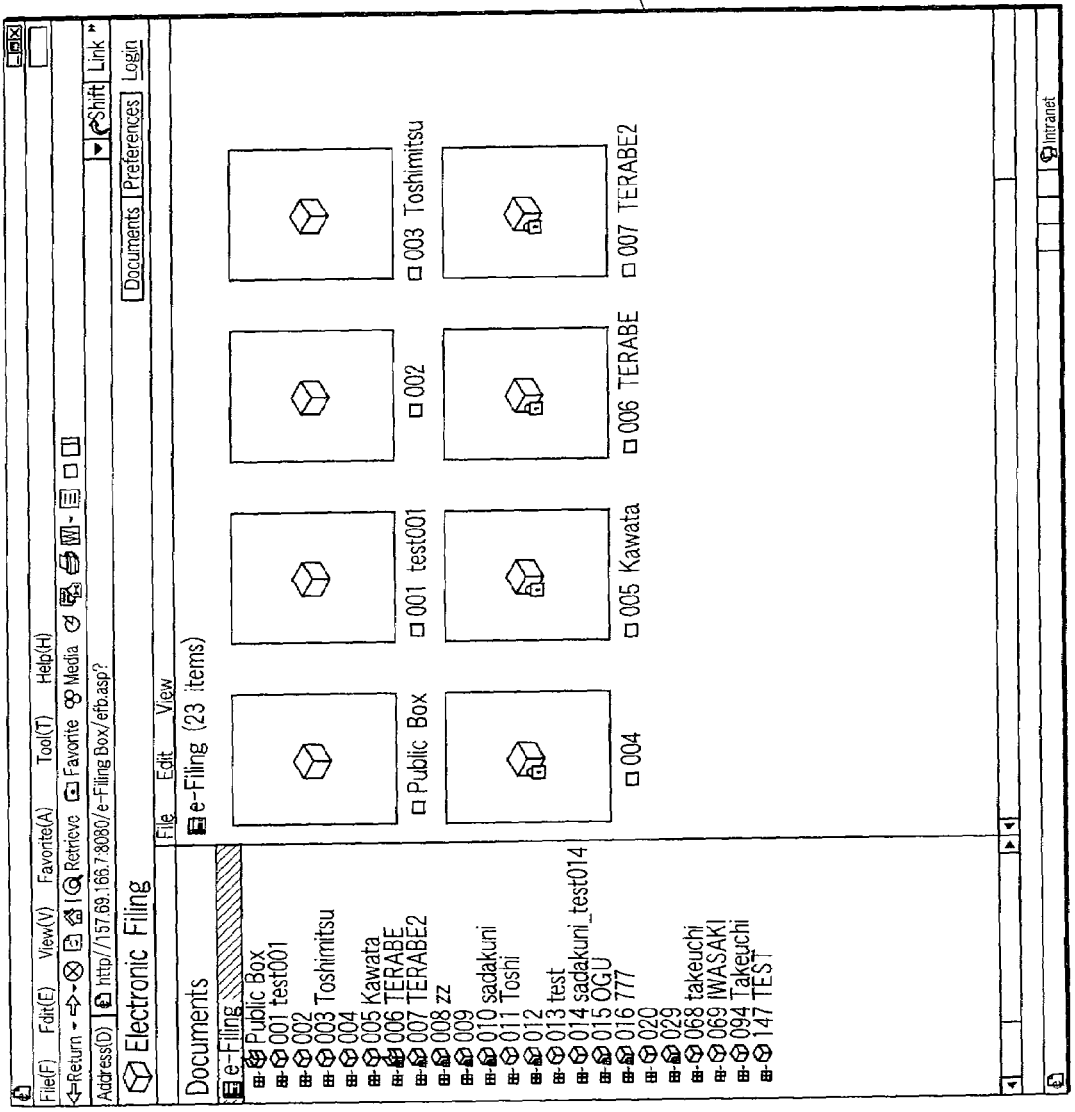
FIG. 13 is a view showing an example of an image displaying boxes provided in an HDD in the second embodiment.
Figure 14:
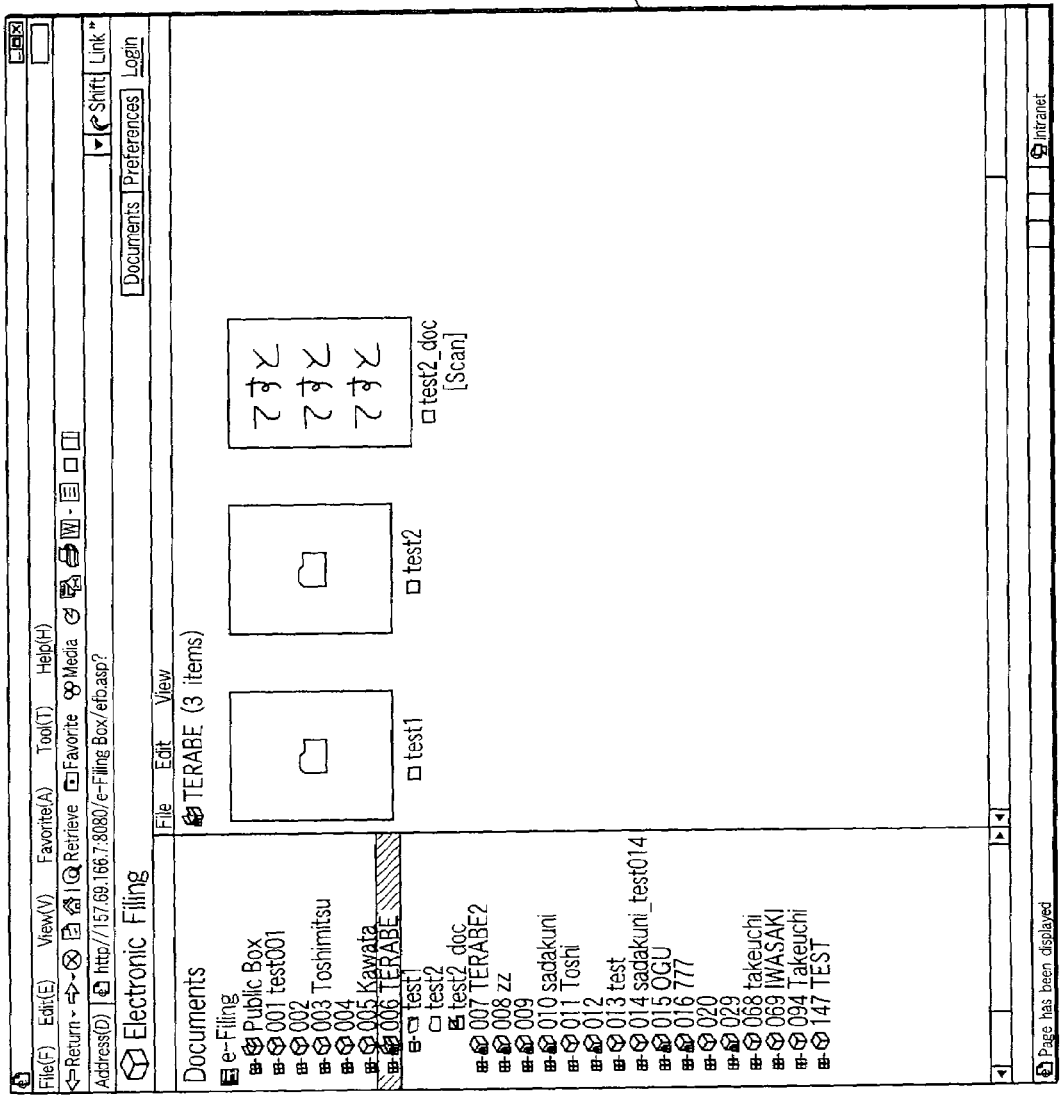
FIG. 14 is a view showing an example of an image displaying folders and electronic document files in a box in the second embodiment.
Figure 15:
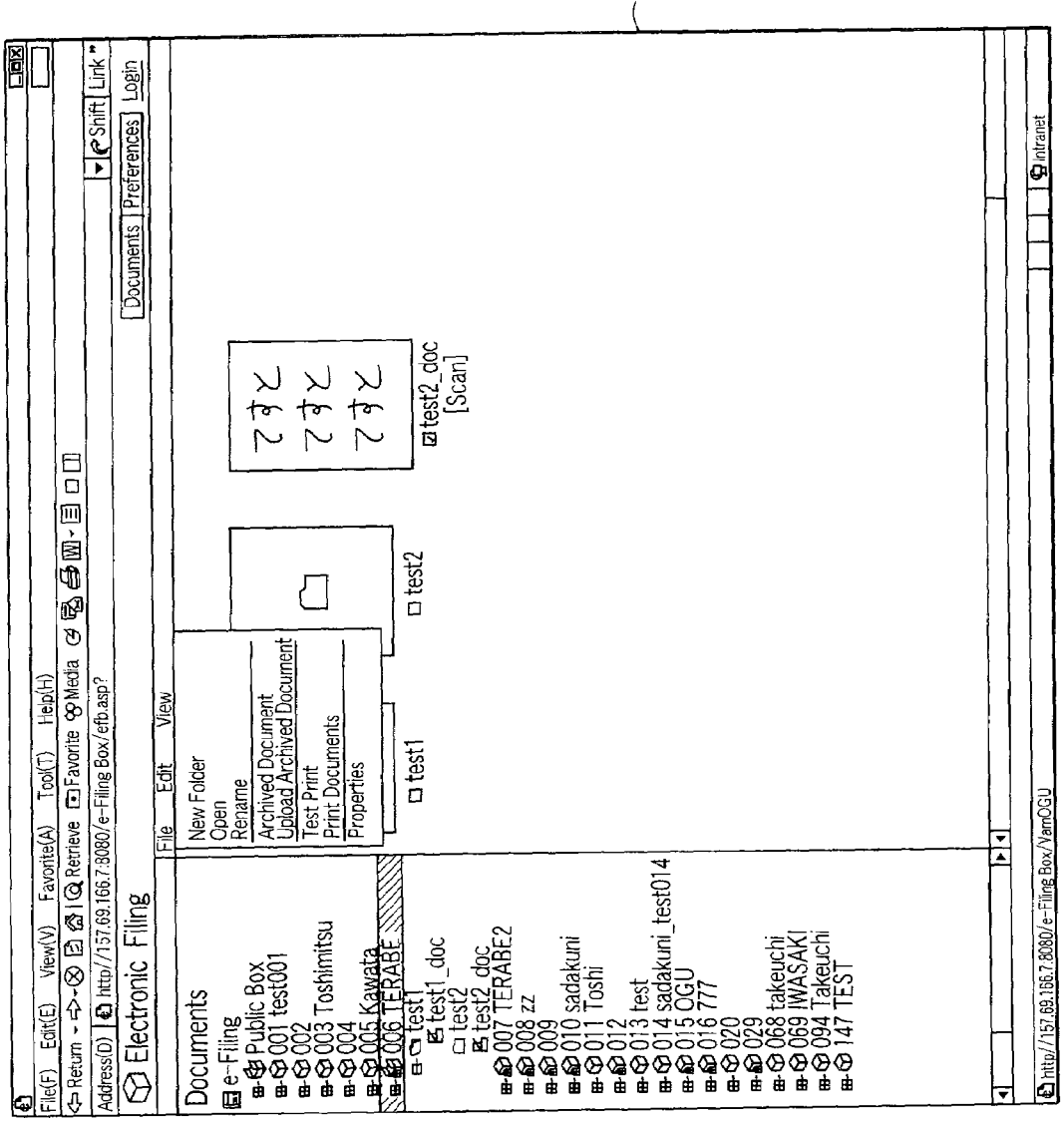
FIG. 15 is a view showing an example of an image displayed when an instruction for archiving an electronic document file is given, in the second embodiment.
Figure 16:
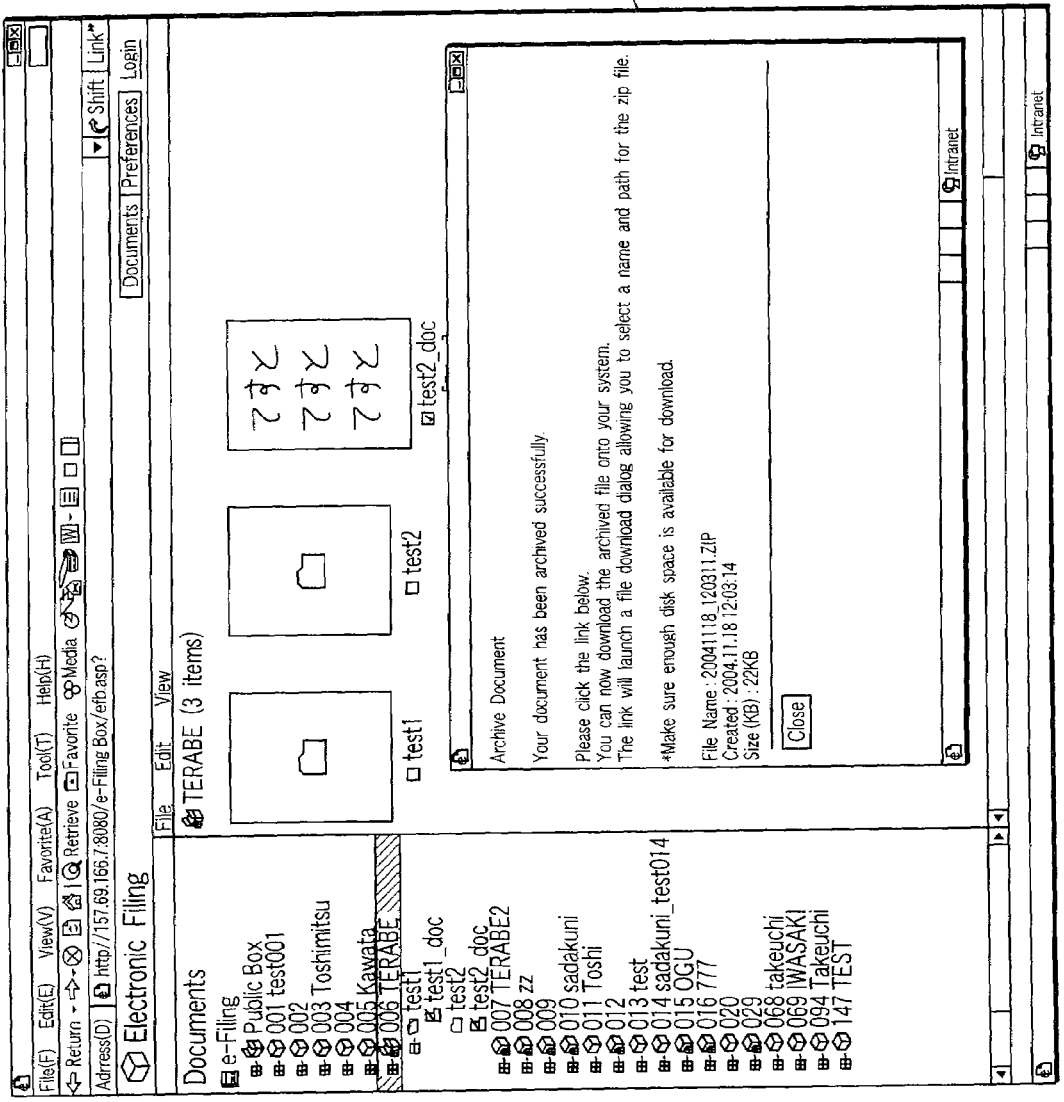
FIG. 16 is a view showing an example of an image displayed when the archived electronic document file is stored in a PC.

The user operates the PC 4, the PC 4 communicates with the MFP 1, and an application for managing electronic document files is started, to have the PC 4 access the MFP 1. Then, the user makes the displaying section 64 of the PC 4 display a list of boxes in the MFP 1. FIG. 13 shows an image displayed by the displaying section 64 when the list of the boxes is displayed at that time. As shown in the figure, a number of boxes such as a public box are displayed. When the user selects, e.g., the box "TERABE", from the boxes displayed by the displaying section 64, electronic document files stored in the box "TERABE" are displayed as shown in FIG. 14. In the displaying section 64, the first page of each of the electronic document files are displayed in thumbnail images. Also, check boxes are provided under the thumbnail images of the electronic document files, respectively. The user checks a check box of a file to be archived. For example, when causing only a file "test2 doc [scan]" to be archived, the user checks the check box under the file. Then, as shown in FIG. 15, when the user opens a menu image from "File" in a tool bar, and selects "Archive Document", then only the selected electronic document file is archived. Then, as shown in FIG. 16, it is displayed that the archived file is stored in the PC 4.

Figure 17:
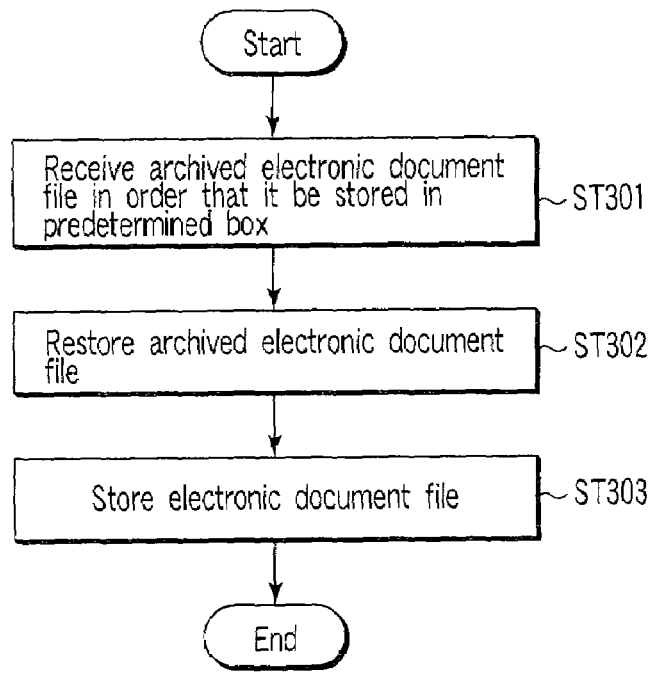
FIG. 17 is a flowchart of another processing in the second embodiment.

The case where the archived electronic document file stored in the PC 4 is uploaded to the MFP 1 will be explained. FIG. 17 is a flowchart schematically showing processings to be executed by the main CPU 41 of the MFP 1.

The main CPU 41 receives the archived electronic document file in order that it be stored in a predetermined box (ST301). Then, the main CPU 41 restores the achieved electronic document file (ST302). That is, the main CPU 41 performs expanding processing on data of the archived electronic document file to convert it into its original data format. Then, the main CPU 41 stores the electronic document file in the box (ST303).

Next, the operation in the case where the user uploads the archived electronic document file stored in the PC 4 to the MFP 1 by using the PC 4 will be explained.

Figure 18:
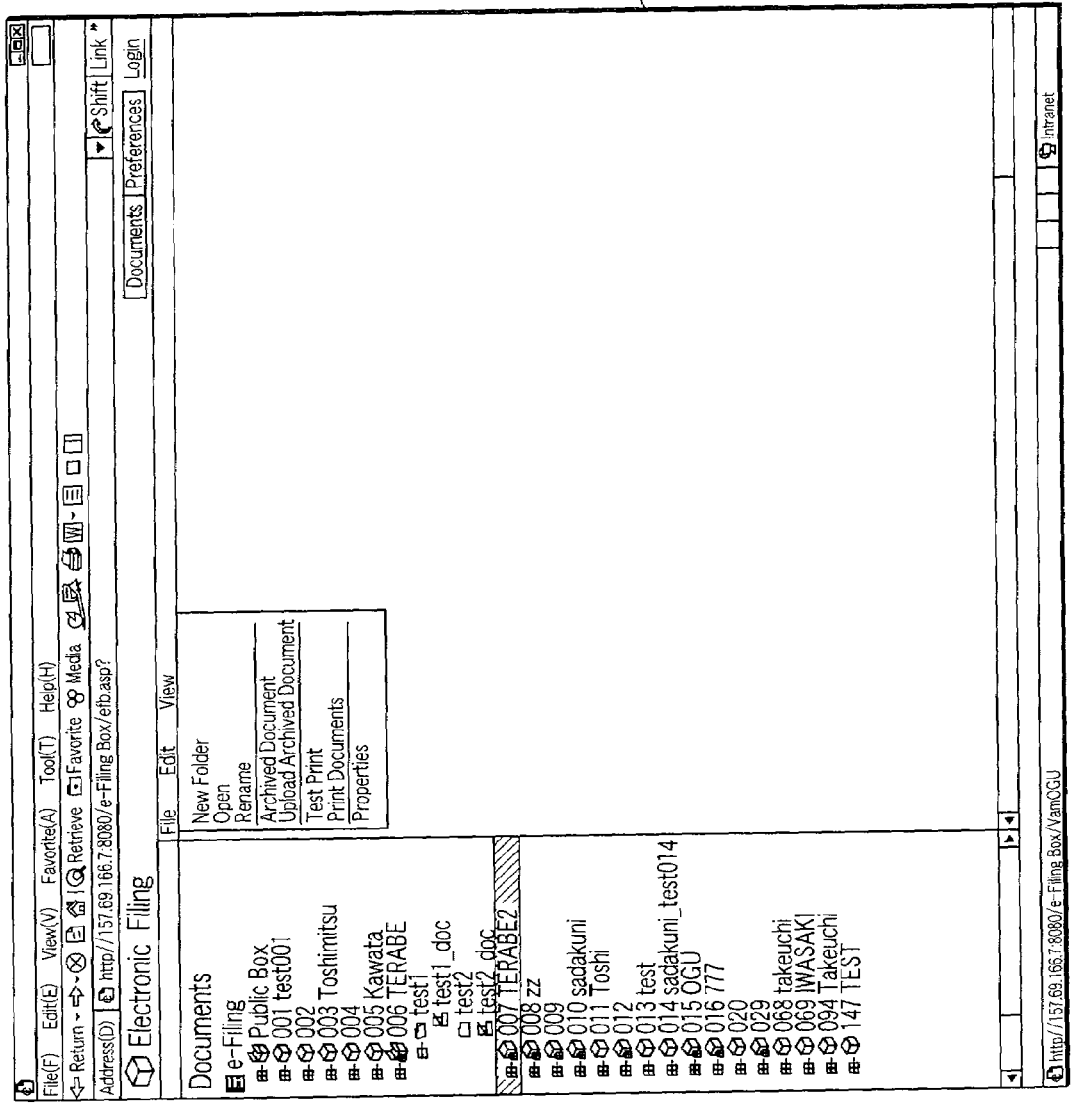
FIG. 18 is a view showing an example of an image displayed when an instruction for uploading the archived electronic document file to an MFP is given, in the second embodiment.
Figure 19:
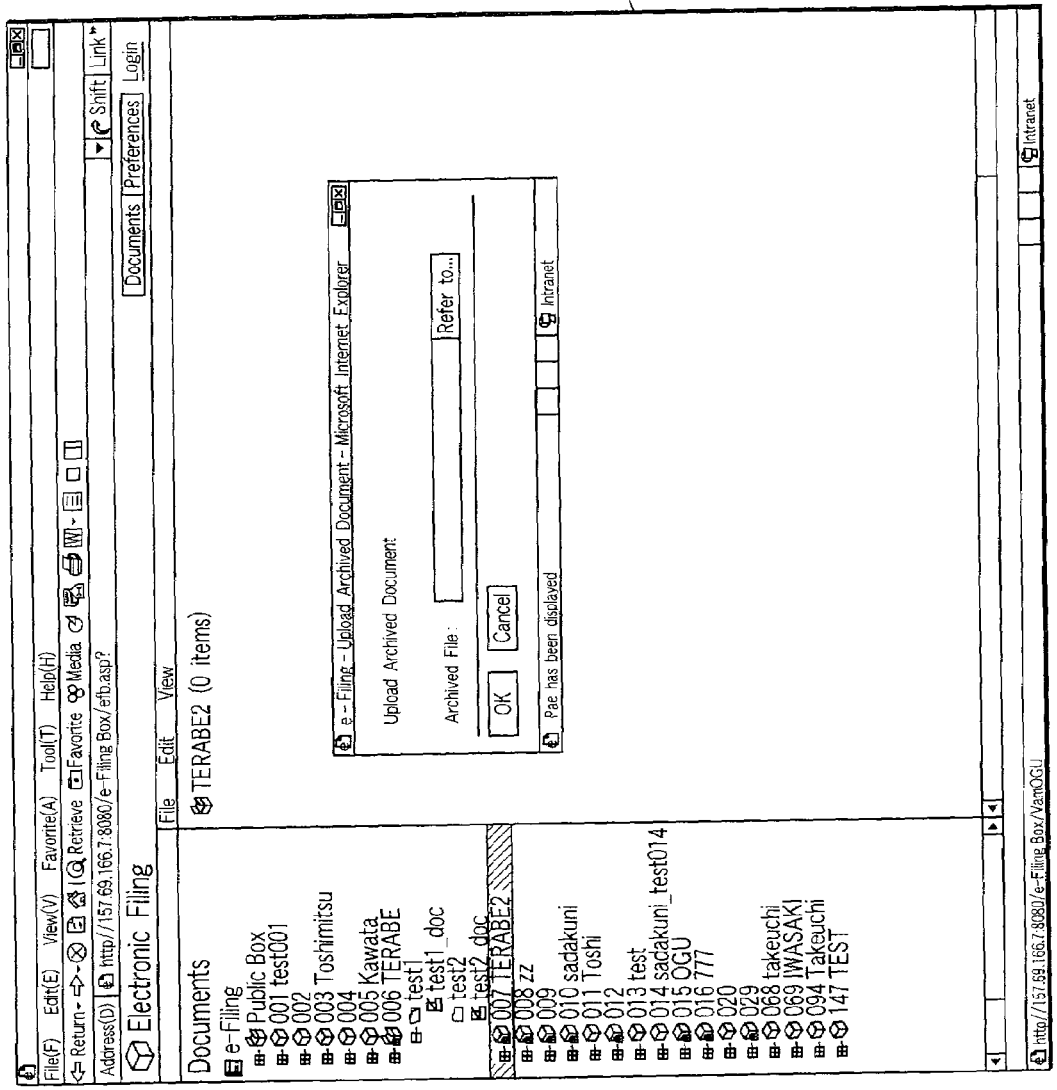
FIG. 19 is a view showing an example of an image displayed when the archived electronic document file to be uploaded is selected, in the second embodiment.
Figure 20:
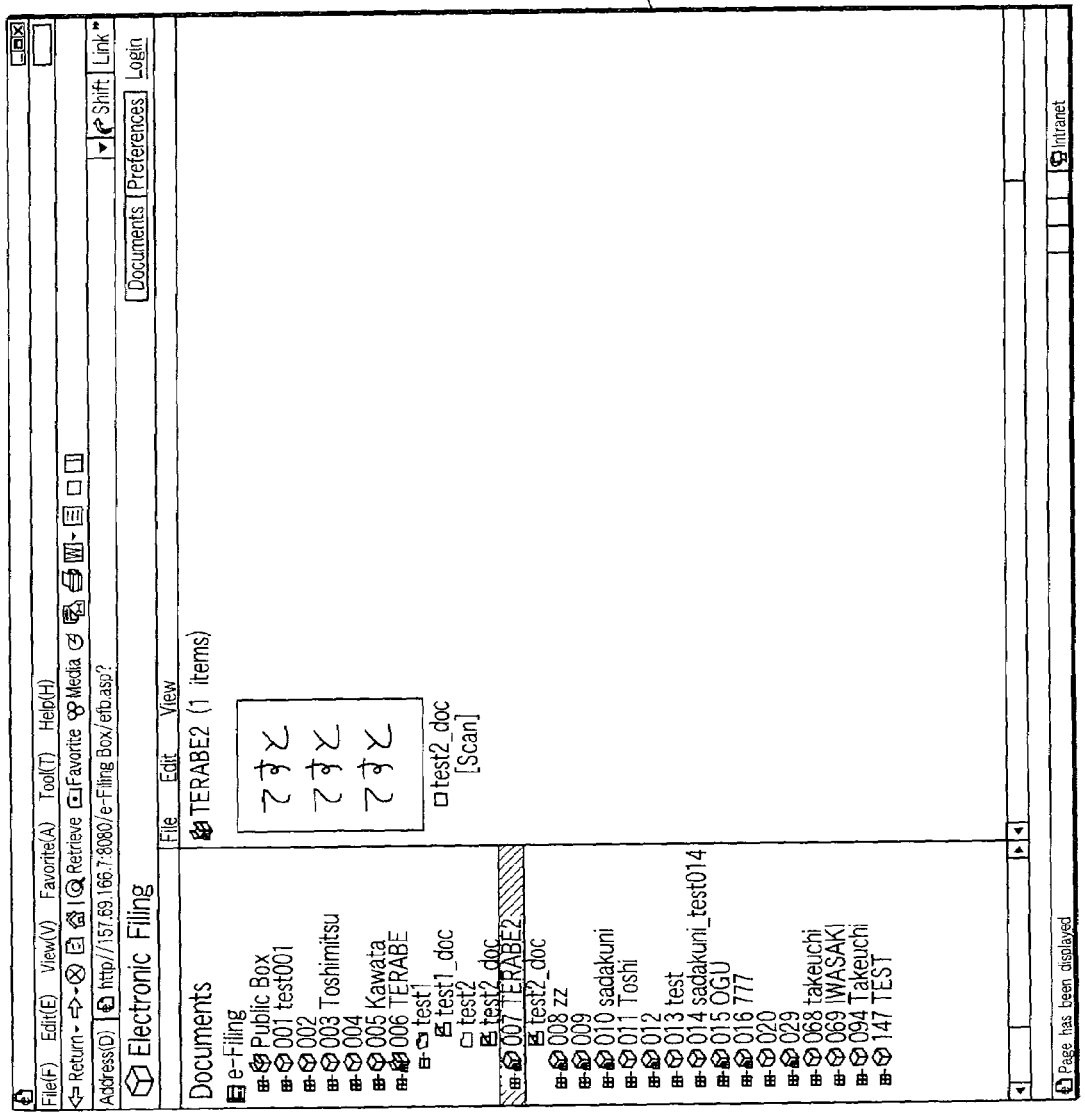
FIG. 20 is a view showing an example of an image of the uploaded electronic document file in the second embodiment.

The user operates the PC 4, starts an application for managing the electronic document file, and has the PC 4 access the MFP 1. Then, the user selects a box to which the archived electronic document file is to be uploaded. For example, he or she selects "TERABE2". As shown in FIG. 18, the box "TER-ABE 2" stores no electronic document file. Then, the user opens a menu image from "File" in a tool bar, and selects "Upload Archive Document". Thereby, as shown in FIG. 19, an image for selecting the archived electronic document file to be uploaded, in the PC 4, is opened. The user inputs the archived electronic document file to be uploaded, on the image. For example, the electronic document file "test2_doc [scan]" achieved by the above processing is input as file name. Then, the archived electronic document file is output to the MFP 1. The electronic document file is restored, and the electronic document file "test2_doc [scan]" is stored in the box "TERABE2". In such a manner, when the electronic document file is stored, the first page of the electronic document file is displayed as a thumbnail image, and the file name "test2_doc [scan]" is displayed. As a result, the user can visually recognize that uploading is completed.

In such a manner, in the MFP 1 according to the second embodiment, by operating the PC 4, the user can archive one electronic document file stored in the box "TERABE" in the MFP 1, in the PC 4, and the archived electronic document file from the PC 4 to the box "TERABE2". That is, the MFP 1 can archive/upload only one electronic document file. Therefore, the MFP 1 enables the user to archive/upload a desired electronic document only. On the other hand, in the conventional MFP 1, archiving/uploading can be carried out in units of one box. Thus, the MFP 1 according to the second embodiment, by comparison the conventional one, the time required for archiving/uploading and the capacity of files can be reduced. Therefore, the MFP 1 according to the second embodiment enables an electronic document file or files stored in a box or boxes to be easily handled.

In the MFP 1, a public box is provided. The public box is a box used by an unspecified number of users. In such a manner, in the case where electronic document files can be stored in the public box, the user can archive/upload a desired document file or files. Thus, the user can prevent an unnecessary file from being archived and backed up. Furthermore, there is a case where boxes other than the public box can be utilized by a number of users. In this case also, each of the users can archive/upload a desired file only, and also archive/upload only an electronic document file newly added. In this case also, the users can prevent an unnecessary file from being archived and backed up.

The second embodiment is explained by referring to the case of archiving/uploading one electronic document file. However, two or more electronic document files may be designated, and archived/uploaded.

The Third Embodiment

The third embodiment will be referred to. The third embodiment will be explained by referring to the case where an electronic document file stored in a box in the HDD 53 in the MFP 1 is automatically downloaded to the PC 4. In the PC 4 in the first embodiment, an application software for automatic downloading is stored in the HDD 66.

Figure 21:
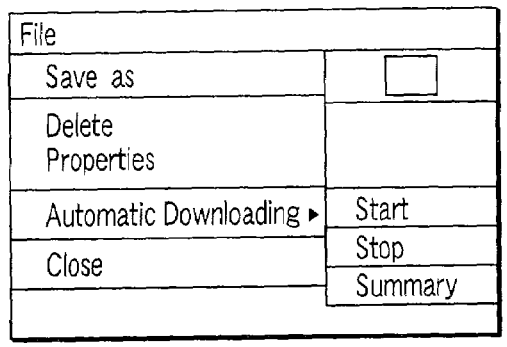
FIG. 21 is a view showing an example of an image displaying a command for automatic downloading in the third embodiment.
Figure 22:
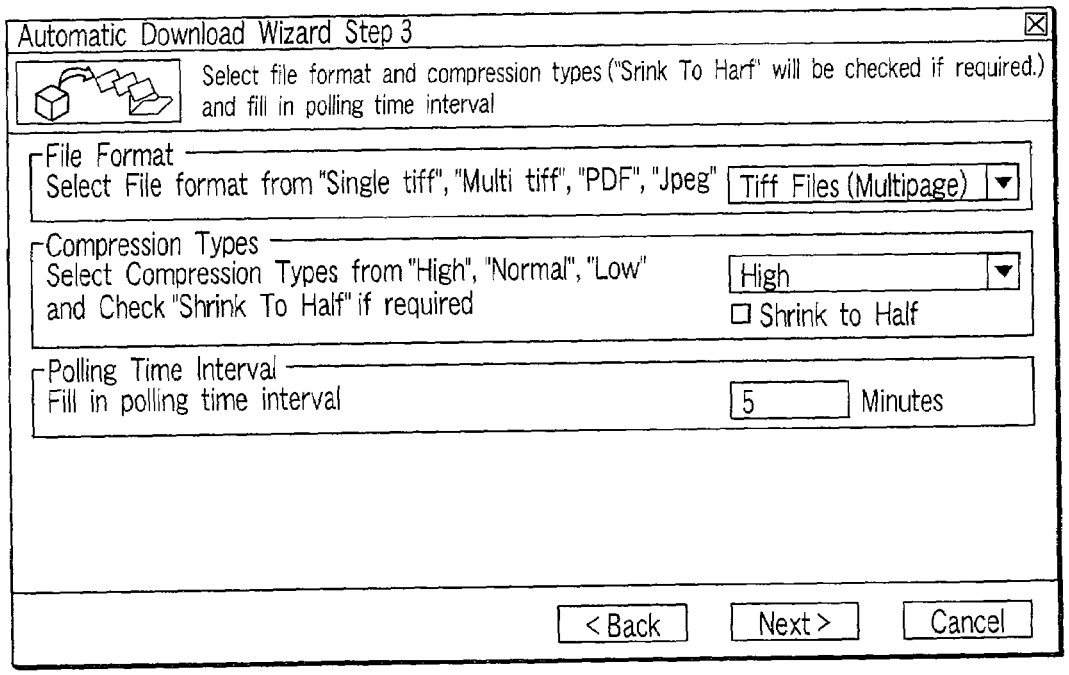
FIG. 22 is a view showing an example of an image displayed when automatic downloading is set.

When the user starts the application software in the PC 4, "File" is displayed in the tool bar. When "File" is selected, a menu image is opened. As shown in FIG. 21, when the user selects "Automatic Downloading", and selects "Properties", an image for setting automatic downloading is displayed as shown in FIG. 22. In setting of automatic downloading, as shown in the figure, a box in the HDD 53 in the MFP 1, the pass for use in storage, the file format and the connection intervals, etc. can be set in a wizard format. In the setting image shown in FIG. 22, the user can set the file format, compression type and connection intervals, etc. It should be noted that when "Next" is selected, setting of the box in the HDD 53 in the MFP 1 and the pass for use in storage, etc. can be carried out.

Figure 23:
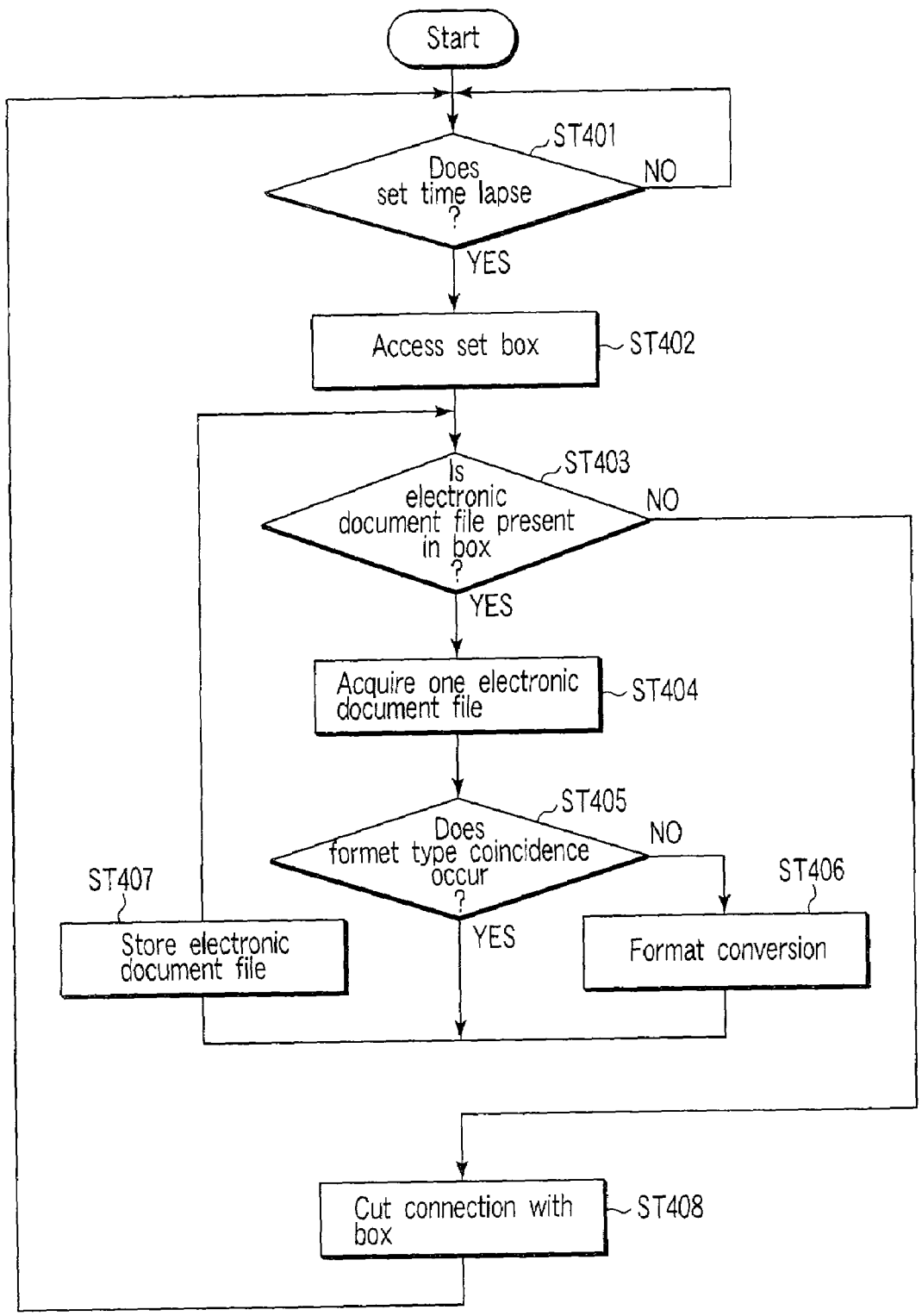
FIG. 23 is a flowchart of processing in the third embodiment.

Next, processing to be executed by the CPU 61 based on information set by the user in the above manner will be explained with reference to FIG. 23.

The CPU 61 determines whether the set time lapses or not (ST401). When this determination is made as "NO", the CPU 61 repeats this determination. When determining that the set time lapses, the CPU 61 accesses the box in the HDD 53 in the MFP 1 (ST402). Then, the CPU 61 determines whether an electronic document file is present in the accessed box or not (ST403). When this determination is made as "YES", the CPU 61 acquires one electronic document file from the accessed box (ST404). It should be noted that an electronic document file output to the PC 4 is deleted from the box in the MFP 1. Next, the CPU 61 determines whether the format type of the electronic document file acquired from the MFP 1 is coincident with the designated format type (ST405). When this determination is made as "NO", the CPU 61 performs format conversion (ST406). This format conversion will be described later with reference to FIG. 24. Furthermore, when the determination in step ST405 is made as "YES", and after format conversion is performed in step ST406, and the CPU 61 stores an electronic document file in a storage portion set in the HDD 66 (ST407). Then, the processing to be performed is returned to that of step ST403, and the CPU 61 determines whether an electronic document file is present in the box or not. In such a manner, this processing is continued until the electronic document files in the box are all acquired. When "NO" is determined in step ST403, the CPU 61 cuts connection with the box (ST408). Then, the processing is returned to ST401, and the above processing is continued until the power supply of the PC 4 is turned off.

Figure 24:
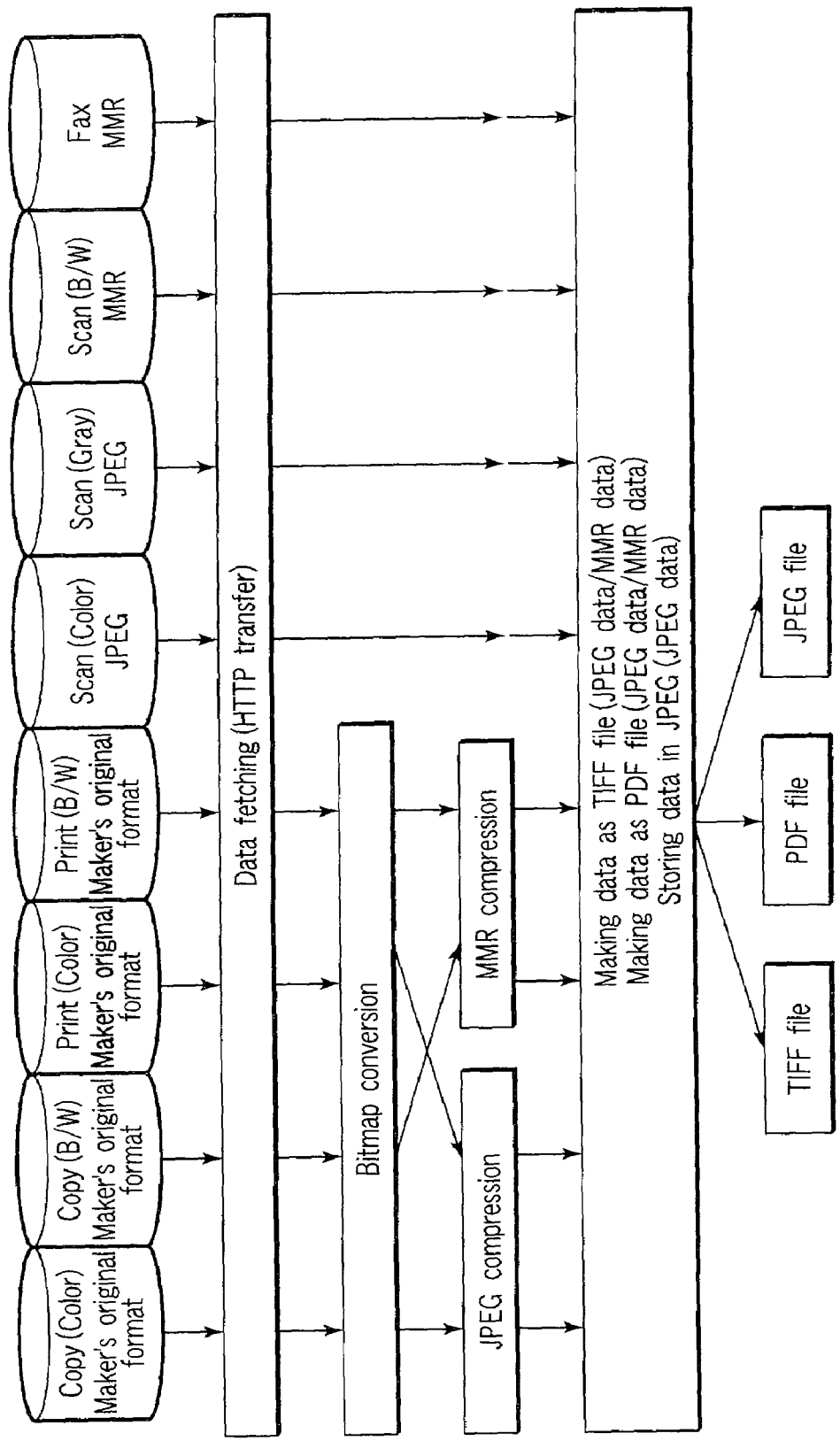
FIG. 24 is a view for use in explaining format conversion of an electronic document file in the third embodiment.

FIG. 24 is a view for use in explaining the above formation conversion. The first rank indicates the format types of electronic document files stored in the MFP 1. The format types of the electronic document files vary in accordance with how they are fetched or whether they are color or monochrome. The second rank indicates processing for acquiring those electronic document files with the PC 4. The third rank indicates processing for performing bitmap conversion on the electronic document files fetched by the original formats of makers. The fourth rank indicates processing for performing JPEG-compressing the color electronic document files subjected to bitmap conversion, and performing MMR-compressing the monochrome electronic document files subjected to bitmap conversion. The fifth rank indicates processing for making data written in the MMR and JPEG formats as TIFF files and PDF files and storing the data in JPEG. Then, which format type the data should be stored in is determined by the user in advance. Then, the data is converted into any of the format types of the TIFF file, the PDF file and the JPEG file.

The operation in the case where the PC 4 automatically downloads an electronic document file from a set predetermined box in the HDD 53 in the MFP 1 will be explained.

The PC 4 accesses the set predetermined box in the HDD 53 in the MFP 1, when each of the time intervals set by the user lapses. Then, in the case where an electronic document file is stored in the box, it is acquired. In the case where it needs to be subjected to format conversion, it is stored in a set storage portion in the HDD 66 after formation conversion. This operation is performed until the electronic document files in the set box are all acquired. Then, when the set time intervals re-lapse, the same operation is performed. Thereby, at each of the set times, an operation of fetching an electronic document file or files newly stored in a box is repeated. It should be noted that since in the MFP 1, the electronic document file or files output to the PC 4 are deleted, electronic documents file or files identical to the deleted electronic file or files are not downloaded.

Therefore, the PC 4 can automatically download electronic document files stored in boxes in the MFP 1. Due to this, electronic document stored in boxes can be easily handled.

Figure 25:
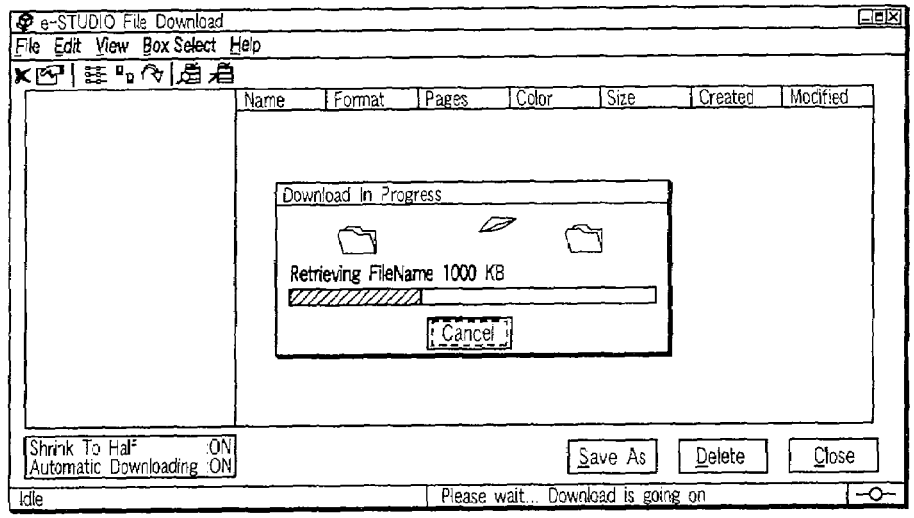
FIG. 25 is a view showing an example of an image displayed when downloading is being performed, in the third embodiment.

It should be noted that when the user selects "Start" from "Automatic Download" in FIG. 21, an electronic document file is downloaded from a box in the MFP 1. At this time, as shown in FIG. 25, an image indicating that downloading is being performed is displayed in the displaying section 64. Also, when the user selects "Stop" from "Automatic Download" during downloading of the electronic document file, downloading thereof is stopped.

Figure 26:
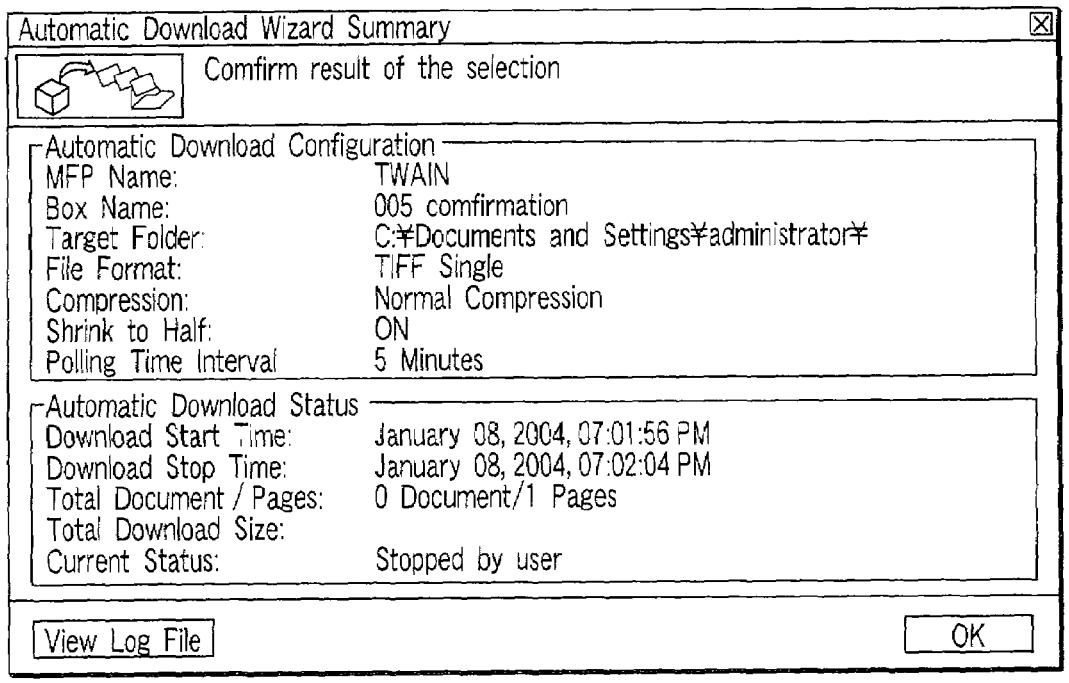
FIG. 26 is a view showing an example of an image for use in checking the condition of downloading in the third embodiment.

Furthermore, even during automatic downloading, the user can check the condition of downloading. When "Summary" is selected from "File" in FIG. 21, an image indicating the downloading condition which is shown in FIG. 26 is displayed in the displaying section 64. The image indicating the downloading condition is also displayed, when "Stop" is selected in the above manner to effect cancel-ending, and an error such as a communication error occurs, as a result of which it becomes impossible to carry out downloading of an electronic document file. At this time, the user selects "View Log File" in FIG. 26 to have a detail log displayed.

Furthermore, in setting of automatic downloading, in the case where an error occurs when automatic downloading is performed, retrying may be performed in subsequent connection without immediately releasing setting of automatic downloading. In this case, the number of times retrying can be performed can be set, e.g., it is set at three, and if an error occurs even when retrying is performed the set number of times, automatic setting of downloading is released. It suffices that it is displayed in the image for use in checking the condition of downloading, which is explained with reference to FIG. 26, that automatic setting of downloading is released.

It should be noted that in the third embodiment, the connection intervals are set in order that an electronic document file be automatically downloaded. However, it is not limited to this. For example, it may be set such that downloading is scheduled, e.g., with respect to what time downloading will be carried out every week, and an electronic document is downloaded at the timing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

It is claimed:

1. An image forming apparatus comprising:

a processor;

a memory coupled to the processor; and a storing device coupled to the processor, the storing device providing a plurality of boxes containing folders which store electronic document files, wherein the processor executes a stored control program causing the image forming apparatus to perform actions including:

accepting a first instruction for deleting a first box;

performing deletion processing to delete the first box and all electronic document files stored in the first box;

inhibiting access to the first box during the deletion processing; and while performing deletion processing, accepting a second instruction and executing processing based on the second instruction, wherein second instructions which can be accepted and executed include:

an instruction to edit an electronic file stored in a second box, an instruction to print predetermined image data stored in a second box, and an instruction to fetch an electronic document file into a second box;

wherein the second box is not the first box; and accepting a third to a fifth instructions or a sixth instruction from a second processor in communication with the image forming apparatus and executing processing based on each of the instructions, wherein the third instruction includes transmission of information of a list of at least one of boxes to the second processor;

the fourth instruction includes transmission of information of at least one of the electronic document files stored in the box selected by the second processor to the second processor;

the fifth instruction includes compression of at least one of the electronic document files selected by the second processor and transmission of the at least one thereof to the second processor; and the sixth instruction includes reception of at least one of compressed electronic document files from the second processor, performance of expanding processing of the at least one thereof and storage of the at least one thereof in a box designated by the second processor.

2. The image forming apparatus according to claim 1, further comprising:

a control panel, wherein the actions performed further include displaying an indication on the control panel that deletion processing is being performed.

3. The image forming apparatus according to claim 1, wherein the storing device provides a plurality of folders for storing electronic document files in the plurality of boxes, and wherein the actions performed further include:

accepting an instruction to delete a specified folder from the plurality of folders; and performing deletion processing to delete all electronic document files in the specified folder.

4. The image forming apparatus according to claim 1,
wherein the storing section stores a plurality of electronic document files in the plurality of boxes, and
wherein the actions performed further include:
accepting an instruction to delete a specified electronic document file from the plurality of electronic document files; and
performing deletion processing to delete the specified electronic document file.

5. The image forming apparatus according to claim 2, wherein the image forming apparatus accepts instructions from a user operating the control panel.

6. A method of managing electronic document files in an image forming apparatus, comprising:
providing a plurality of boxes containing folders which store electronic document files;
accepting a first instruction for deleting a first box;
performing deletion processing to delete the first box and all electronic document files stored in the box;
inhibiting access to the first box during the deletion processing; and
while performing deletion processing, accepting a second instruction and executing processing based on the second instruction, wherein second instructions which can be accepted and executed include:
an instruction to edit an electronic file stored in a second box,
an instruction to print predetermined image data stored in a second box, and
an instruction to fetch an electronic document file into a second box,
wherein the second box is not the first box; and
accepting a third to a fifth instructions or a sixth instruction from a second processor in communication with the image forming apparatus and executing processing based on each of the instructions, wherein
the third instruction includes transmission of information of a list of at least one of boxes to the second processor;
the fourth instruction includes reception transmission of information of at least one of the electronic document files stored in the box selected by the second processor to the second processor;
the fifth instruction includes compression of at least one of the electronic document files selected by the second processor and transmission of the at least one thereof to the second processor; and
the sixth instruction includes reception of at least one of compressed electronic document files from the second processor, performance of expanding processing of the at least one thereof and storage of the at least one thereof in a box designated by the second processor.

7. The method of managing electronic document files according to claim 6, further comprising:
displaying an indication on a control panel of the image forming apparatus that deletion processing is being performed.

8. The method of managing electronic document files according to claim 6, the actions performed further including:
providing a plurality of folders for storing electronic document files in the plurality of boxes;
accepting an instruction to delete a specified folder from the plurality of folders; and
performing deletion processing to delete all electronic document files in the specified folder.

9. The method of managing electronic document files according to claim 6, the actions performed further including:
storing a plurality of electronic document files in the plurality of boxes;
accepting an instruction to delete a specified electronic document file from the plurality of electronic document files; and
performing deletion processing to delete the specified electronic document file.

10. The method of managing electronic document files according to claim 7, the actions performed further including:
accepting instructions from a user operating the control panel of the image forming apparatus.

* * * * *

UNITED STATES PATENT AND TRADEMARK OFFICE
CERTIFICATE OF CORRECTION

| | | |
|---|---|---|
| PATENT NO. | : 7,640,243 B2 | Page 1 of 1 |
| APPLICATION NO. | : 11/609830 | |
| DATED | : December 29, 2009 | |
| INVENTOR(S) | : Katsuki Ogata | |

It is certified that error appears in the above-identified patent and that said Letters Patent is hereby corrected as shown below:

Column 1, line 33: replace "and of one" with --and downloaded kinds of data is uploaded from the PC to the MFP, these processings need to be performed in units of one--.

Column 1, line 43: delete "downloaded kinds of data is uploaded from the PC to the MFP, these processings need to be performed in units".

Signed and Sealed this

Ninth Day of February, 2010

David J. Kappos
*Director of the United States Patent and Trademark Office*